US012574473B2

(12) United States Patent
Zhang et al.

(10) Patent No.: US 12,574,473 B2
(45) Date of Patent: Mar. 10, 2026

(54) CAMERA-TARGETED SOUND PICKUP

(71) Applicant: Huawei Technologies Co., Ltd.,
Shenzhen (CN)

(72) Inventors: Lei Zhang, Dongguan (CN); **Zhihui
Liu**, Dongguan (CN)

(73) Assignee: **HUAWEI TECHNOLOGIES CO.,
LTD.**, Shenzhen (CN)

( * ) Notice: Subject to any disclaimer, the term of this
patent is extended or adjusted under 35
U.S.C. 154(b) by 230 days.

(21) Appl. No.: 18/301,034

(22) Filed: Apr. 14, 2023

(65) Prior Publication Data

US 2023/0254639 A1    Aug. 10, 2023

Related U.S. Application Data

(63) Continuation of application No.
PCT/CN2021/123075, filed on Oct. 11, 2021.

(30) Foreign Application Priority Data

Oct. 16, 2020    (CN) ........................... 202011112113.2
Dec. 31, 2020    (CN) ......................... 202011639494.X

(51) Int. Cl.
| | |
|---|---|
| *H04N 7/14* | (2006.01) |
| *G06T 7/20* | (2017.01) |
| *G06T 7/55* | (2017.01) |
| *G06T 7/70* | (2017.01) |
| *G06V 10/764* | (2022.01) |
| *G06V 40/10* | (2022.01) |
| *H04R 1/40* | (2006.01) |
| *H04R 3/00* | (2006.01) |

(52) U.S. Cl.
CPC ............... H04N 7/147 (2013.01); G06T 7/20
(2013.01); G06T 7/55 (2017.01); G06T 7/70
(2017.01); G06V 10/764 (2022.01); **G06V
40/10 (2022.01); H04R 1/406** (2013.01);
H04R 3/005 (2013.01); *G06T 2207/30201*
(2013.01); *G06T 2207/30242* (2013.01)

(58) Field of Classification Search
CPC .......... H04R 3/005; H04R 1/406; G06T 7/20;
G06T 7/55; G06T 7/70; G06V 10/764;
G06V 40/10; H04N 7/147
See application file for complete search history.

(56) References Cited

U.S. PATENT DOCUMENTS

| | | | |
|---|---|---|---|
| 5,940,118 A | 8/1999 | Van Schyndel | |
| 2014/0192997 A1 | 7/2014 | Niu et al. | |
| 2015/0022636 A1* | 1/2015 | Savransky | ............... H04R 3/00 |
| | | | 348/46 |

(Continued)

FOREIGN PATENT DOCUMENTS

| | | |
|---|---|---|
| CN | 104320729 A | 1/2015 |
| CN | 109313904 A | 2/2019 |

(Continued)

*Primary Examiner* — Nicholas G Giles
(74) *Attorney, Agent, or Firm* — Conley Rose, P.C.

(57) ABSTRACT

A sound pickup method is implemented by a device having
a camera and a microphone. The method includes determin-
ing a target person in an image captured by the camera;
determining a target sound pickup range based on a location
of the target person in the image; and performing sound
pickup in the target sound pickup range using the micro-
phone.

20 Claims, 10 Drawing Sheets

(56)           References Cited

U.S. PATENT DOCUMENTS

| 2015/0237455 | A1  | 8/2015  | Mitra et al. |
| 2017/0188140 | A1  | 6/2017  | Duzinkiewicz et al. |
| 2021/0152733 | A1* | 5/2021  | Kasugai ............... H04N 23/611 |

FOREIGN PATENT DOCUMENTS

| CN | 109754814    | A  | 5/2019  |
| CN | 111050269    | A  | 4/2020  |
| DE | 102011085361 | A1 | 5/2013  |
| JP | H10155107    | A  | 6/1998  |
| JP | 2012186551   | A  | 9/2012  |
| WO | 2014132533   | A1 | 9/2014  |
| WO | 2015168901   | A1 | 11/2015 |
| WO | 2020078237   | A1 | 4/2020  |

* cited by examiner

200

300

400

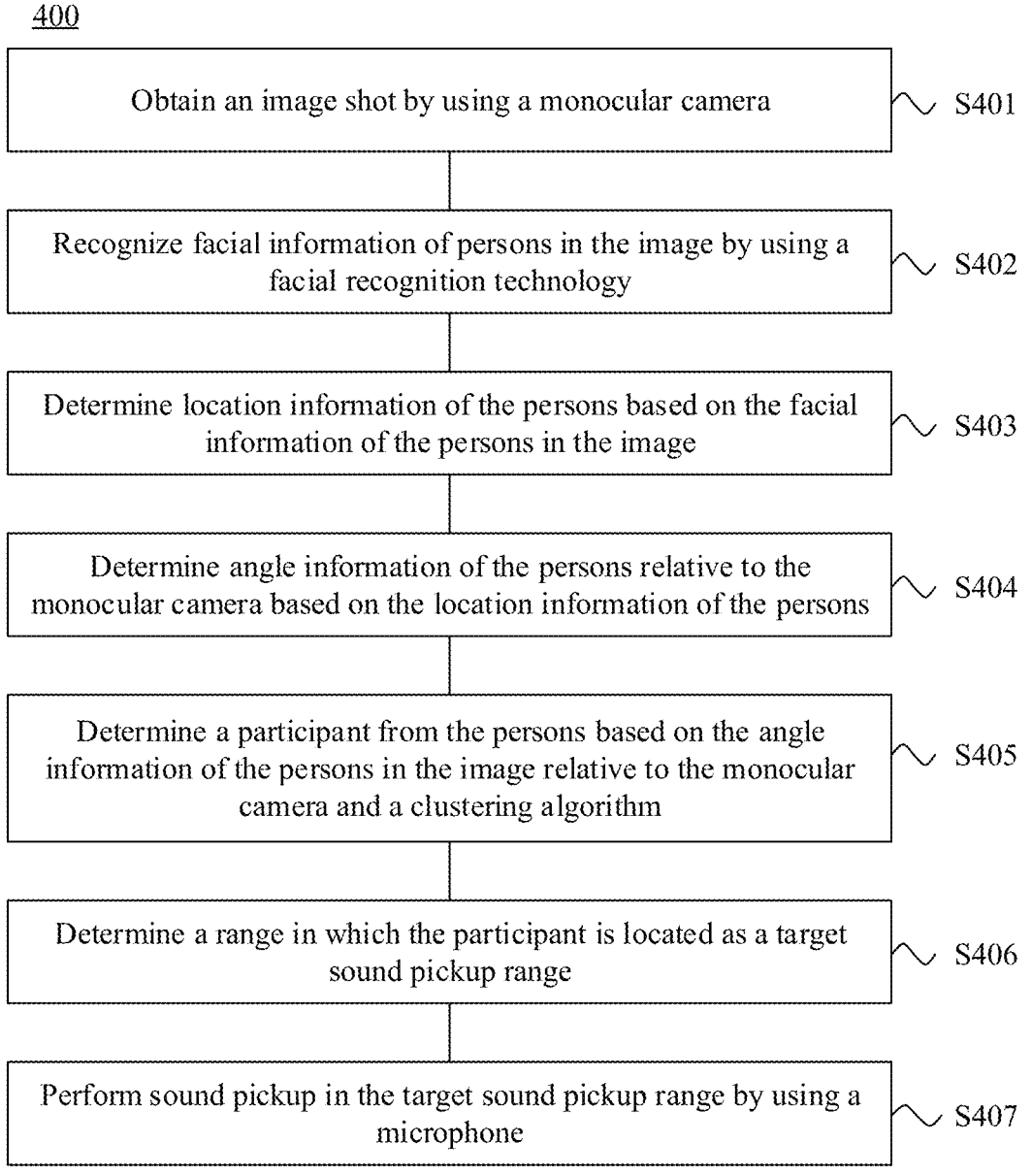

| Obtain an image shot by using a monocular camera | S401 |

| Recognize facial information of persons in the image by using a facial recognition technology | S402 |

| Determine location information of the persons based on the facial information of the persons in the image | S403 |

| Determine angle information of the persons relative to the monocular camera based on the location information of the persons | S404 |

| Determine a participant from the persons based on the angle information of the persons in the image relative to the monocular camera and a clustering algorithm | S405 |

| Determine a range in which the participant is located as a target sound pickup range | S406 |

| Perform sound pickup in the target sound pickup range by using a microphone | S407 |

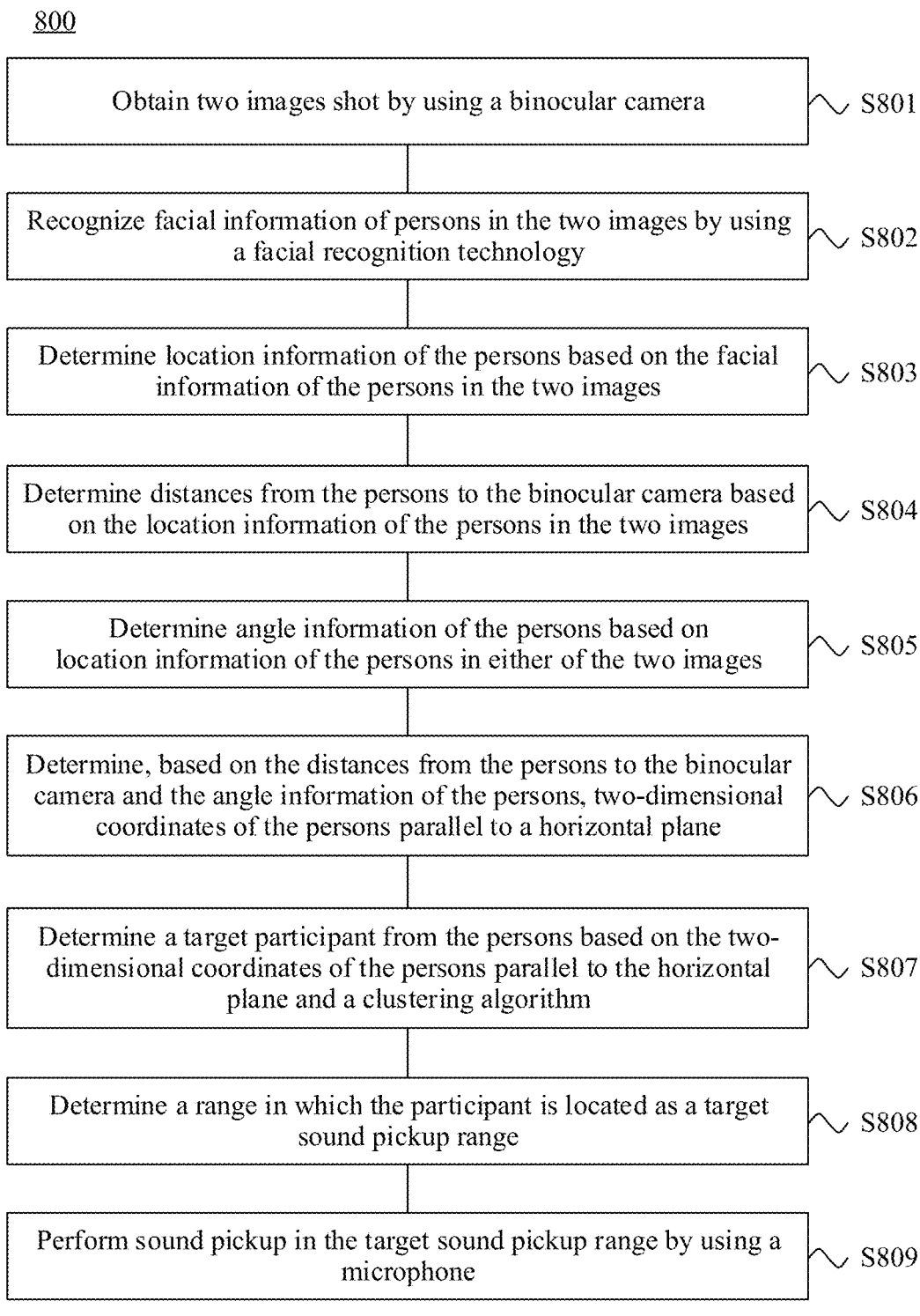

800

Obtain two images shot by using a binocular camera    S801

Recognize facial information of persons in the two images by using a facial recognition technology    S802

Determine location information of the persons based on the facial information of the persons in the two images    S803

Determine distances from the persons to the binocular camera based on the location information of the persons in the two images    S804

Determine angle information of the persons based on location information of the persons in either of the two images    S805

Determine, based on the distances from the persons to the binocular camera and the angle information of the persons, two-dimensional coordinates of the persons parallel to a horizontal plane    S806

Determine a target participant from the persons based on the two-dimensional coordinates of the persons parallel to the horizontal plane and a clustering algorithm    S807

Determine a range in which the participant is located as a target sound pickup range    S808

Perform sound pickup in the target sound pickup range by using a microphone    S809

FIG. 8

CAMERA-TARGETED SOUND PICKUP

CROSS-REFERENCE TO RELATED APPLICATIONS

This application is a continuation of International Patent Application No. PCT/CN2021/123075 filed on Oct. 11, 2021, which claims priority to Chinese Patent Application No. 202011639494.X filed on Dec. 31, 2020, and Chinese Patent Application No. 202011112113.2 filed on Oct. 16, 2020. All of the aforementioned patent applications are hereby incorporated by reference in their entireties.

TECHNICAL FIELD

The present disclosure relates to the field of information technologies, and in particular, to a sound pickup method and apparatus.

BACKGROUND

A sound pickup device is configured to pick up sound information to transmit the sound information. For example, bank staff may pick up language information of customers through the sound pickup device to communicate with the customers, an intelligent sound box picks up a language instruction of a user through the sound pickup device to complete a corresponding task, and conference software picks up language information of participants through the sound pickup device to implement cross-region communication.

In the conventional technology, the sound pickup device may pick up a sound in a specific angle area by setting a sound pickup angle range of a fixed beam. According to the method, a sound in a closed area can be picked up, but when a sound is picked up in an open area, effect is not good.

SUMMARY

The present disclosure provides a sound pickup method and apparatus, so that a person in a field-of-view range of a camera can be detected by using an image shot by the camera, and a sound pickup range can be flexibly adjusted based on a location of the person, thereby improving sound pickup effect.

According to a first aspect, a sound pickup method is provided, applied to a device including a camera and a microphone. The method includes determining a target person based on an image that is shot by the camera and that includes at least one person; determining a range in which the target person is located as a target sound pickup range; and performing sound pickup in the target sound pickup range by using the microphone.

It should be understood that, if there is no person in the image shot by the camera, the microphone in the sound pickup device is in an off state, that is, sound pickup is not performed.

According to the method provided in this embodiment of the present disclosure, a person in a field-of-view range of the camera may be monitored by using the image shot by the camera, and the target sound pickup range may be determined based on the range in which the target person is located. According to the method, the sound pickup range can be flexibly adjusted based on the person in the field-of-view range, thereby improving sound pickup effect.

With reference to the first aspect, in some implementations of the first aspect, the determining a target person based on an image that is shot by the camera and that includes at least one person may include: determining the target person based on angle information of the at least one person relative to the camera and a distance from the at least one person to the camera, where the angle information is determined based on a correspondence between pixel information of the at least one person in the image shot by the camera and a field of view of the camera.

Specifically, each pixel in the image shot by the camera with the field of view of the camera is calibrated for the sound pickup device before delivery. In this case, the sound pickup device may obtain the angle information of the at least one person based on the pixel information of the at least one person in the image shot by the camera. Then, two-dimensional coordinates of the at least one person on a horizontal plane are determined based on the angle information of the at least one person and the distance from the at least one person to the camera. Finally, the target person is determined based on the two-dimensional coordinates of the at least one person relative to the horizontal plane.

According to the method provided in this embodiment of the present disclosure, the two-dimensional coordinates of the at least one person relative to the horizontal plane may be determined based on the angle information of the at least one person in the image and information about the distance from the at least one person to the camera, and the target person may be determined based on a distribution range of the two-dimensional coordinates of the at least one person. In this way, a rectangular sound pickup range is flexibly determined based on a range in which two-dimensional coordinates of the target person is located, thereby improving sound pickup effect.

With reference to the first aspect, in some implementations of the first aspect, the image shot by the camera may include a first image and a second image, and both the first image and the second image include the at least one person. The sound pickup method may further include determining a difference between coordinates of the at least one person in the first image and the second image as parallax of the at least one person, and determining the distance from the at least one person to the camera based on the parallax of the at least one person.

Specifically, the sound pickup device may determine a difference between coordinate values of a same person in different images, namely, the parallax, based on two images that are shot by the camera and that include the at least one person at a same moment, and then determine the distance from the at least one person to the camera by using a similarity triangle principle and the parallax.

According to the method provided in this embodiment of the present disclosure, the distance from the at least one person to the camera may be determined by using two images of the at least one person shot by the camera, so that hardware costs and integration difficulty can be reduced.

With reference to the first aspect, in some implementations of the first aspect, the distance from the at least one person to the camera is obtained by using a depth sensor.

According to the method provided in this embodiment of the present disclosure, the distance from the at least one person to the camera may be determined by using the depth sensor, and no internal calculation is required, thereby reducing calculation complexity, and improving efficiency of determining the sound pickup range. In addition, precision of the sound pickup range may be further improved by using the depth sensor, thereby improving user experience.

With reference to the first aspect, in some implementations of the first aspect, the at least one person includes two or more persons. Determining the target person based on location information of the at least one person in the image shot by the camera and angle information of the at least one person relative to the camera may include: classifying the at least one person into at least two types of persons by using a clustering algorithm and the angle information; determining angles between the at least two types of persons and a preset central location based on the angle information of the at least two types of persons; selecting, from the at least two types of persons, a target cluster whose angle from the preset central location is less than or equal to a first threshold and whose quantity of persons is greater than or equal to a second threshold; and determining a person in the target cluster as the target person.

It should be understood that, when the at least one person includes one person, the sound pickup device may determine an angle between the person and the preset central location, and if the angle is less than or equal to the first threshold, determine the person as the target person.

According to the method provided in this embodiment of the present disclosure, the angle information of the at least one person may be determined based on the pixel information of the at least one person in the image, and the target person may be determined based on an angle range of the at least one person, to determine an angle distribution range of the target person, to flexibly determine a sector sound pickup range, thereby improving the sound pickup effect.

With reference to the first aspect, in some implementations of the first aspect, the at least one person includes two or more persons. The determining the target person based on angle information of the at least one person relative to the camera and a distance from the at least one person to the camera may include: determining the two-dimensional coordinates of the at least one person on the horizontal plane based on the distance from the at least one person to the camera and the angle information; classifying the at least one person into at least two types of persons by using a clustering algorithm and the two-dimensional coordinates; determining distances between the at least two types of persons and a preset central location based on the two-dimensional coordinates of the at least two types of persons; selecting, from the at least two types of persons, a target cluster whose distance from the preset central location is less than or equal to a third threshold and whose quantity of persons is greater than or equal to a fourth threshold; and determining a person in the target cluster as the target person.

It should be understood that, when the at least one person includes one person, the sound pickup device may determine a distance between the person and the preset central location, and if the distance is less than or equal to the third threshold, determine the person as the target person.

According to the method provided in this embodiment of the present disclosure, the two-dimensional coordinates of the at least one person on the horizontal plane may be determined based on the distance from the at least one person to the camera and the angle information, and the target person may be determined based on the two-dimensional coordinate range of the at least one person. In this way, the rectangular sound pickup range is flexibly determined based on the two-dimensional coordinate distribution range of the target person, thereby improving sound pickup effect.

With reference to the first aspect, in some implementations of the first aspect, before the determining a target person, the sound pickup method further includes obtaining a third image of the at least one person at a first moment and a fourth image of the at least one person at a second moment by using the camera, and determining, based on location information of the at least one person in the third image and the fourth image, that a movement range of the at least one person is less than or equal to a fifth threshold.

Specifically, the sound pickup device may shoot images of the at least one person at different moments by using the camera, and determine, based on a difference between locations of the at least one person in the images at the different moments, whether the at least one person moves in a large range. If there is a large movement, that is, the movement range of the at least one person is greater than the fifth threshold, images of the at least one person are continued to be shot at different moments by using the camera. If there is small movement, that is, the movement range of the at least one person is less than or equal to the fifth threshold, it is determined that the movement range of the at least one person is basically stable. In this case, the target person is determined based on the images that are shot by the camera and that include the at least one person, the range in which the target person is located is determined as the target sound pickup range, and sound pickup is performed on the sound of the target person by using the microphone.

It should be understood that, if the movement range of the at least one person is less than or equal to the fifth threshold, the sound pickup device may determine the target person based on the third image, or the fourth image, or the image that is shot by the camera and that includes the at least one person. Therefore, the range in which the target person is located is determined as the target sound pickup range, and sound pickup is performed in the target sound pickup range.

According to the sound pickup method provided in this embodiment of the present disclosure, a person with big movement may be excluded based on location information of the at least one person in the images at different moments. This helps determine the target person, flexibly adjust the sound pickup range, and improve the sound pickup effect.

With reference to the first aspect, in some implementations of the first aspect, before the determining a range in which the target person is located as a target sound pickup range, the method may further include: determining a candidate sound pickup range based on the range in which the target person is located, and comparing the candidate sound pickup range with a sound pickup range configured on the sound pickup device; and determining that an amplitude of a difference between the candidate sound pickup range and the sound pickup range configured on the sound pickup device is greater than or equal to a sixth threshold.

It should be understood that the sound pickup range configured on the sound pickup device may be an initial default value, or may be a previously determined target sound pickup range.

When an amplitude of a change between the candidate sound pickup range and the target sound pickup range configured on the sound pickup device is greater than or equal to the sixth threshold, the sound pickup device uses the candidate sound pickup range as a new target sound pickup range. If the amplitude of the change between the candidate sound pickup range and the target sound pickup range configured on the sound pickup device is less than the sixth threshold, no additional processing is performed.

According to the sound pickup method provided in this embodiment, the sound pickup range may be adjusted when it is determined that an error of an originally configured sound pickup range is large due to a location change of the target person. In this way, the sound pickup device does not frequently determine the sound pickup range, thereby helping reduce calculation costs and improve efficiency of adjusting the sound pickup range.

According to a second aspect, a sound pickup apparatus is configured to perform the method in any possible implementation of the first aspect. Specifically, the apparatus includes a module configured to perform the method in any possible implementation of the first aspect.

According to a third aspect, another sound pickup apparatus is provided, including a processor. The processor is coupled to a memory, and may be configured to execute instructions in the memory, to implement the method in any possible implementation of the first aspect. Optionally, the apparatus further includes the memory. Optionally, the apparatus further includes a communication interface, and the processor is coupled to the communication interface.

According to a fourth aspect, a processor is provided, including an input circuit, an output circuit, and a processing circuit. The processing circuit is configured to: receive a signal through the input circuit, and transmit a signal through the output circuit, so that the processor is enabled to perform the method in any possible implementation of the first aspect.

In a specific implementation process, the processor may be a chip, the input circuit may be an input pin, the output circuit may be an output pin, and the processing circuit may be a transistor, a gate circuit, a flip-flop, various logic circuits, and the like. An input signal received by the input circuit may be received and input by, for example, but not limited to, a receiver. A signal output by the output circuit may be, for example, but not limited to, output to and transmitted by the transmitter. The input circuit and the output circuit may be a same circuit, and the circuit is configured as the input circuit and the output circuit at different moments. Specific implementations of the processor and various circuits are not limited in embodiments of the present disclosure.

According to a fifth aspect, a computer-readable storage medium is provided. The computer-readable storage medium stores a computer program (which may also be referred to as code or instructions). When the computer program is run on a computer, the computer is enabled to perform the method in any possible implementation of the first aspect.

BRIEF DESCRIPTION OF DRAWINGS

FIG. 4 is a schematic flowchart of another sound pickup method according to an embodiment of the present disclosure;

FIG. 8 is a schematic flowchart of another sound pickup method according to an embodiment of the present disclosure;

DESCRIPTION OF EMBODIMENTS

The following describes technical solutions of the present disclosure with reference to the accompanying drawings.

A sound pickup device is a device including a microphone, and is configured to pick up sound information to transmit the sound information. The sound pickup device may be in various forms, for example, a headset, a smart speaker, or a conference terminal.

The following describes embodiments of the present disclosure by using an example in which the sound pickup device is a conference terminal on which conference software is deployed. It should be understood that the conference terminal is widely applied, and using the conference terminal to perform a video or voice conference can resolve a problem of high costs caused by a cross-region conference. Currently, the conference terminal is deployed in an environment of an open area or a conference room with no professional acoustic design. As a result, the conference terminal may pick up noise in the open area or noise of a non-participant, and this affects call experience and further affects communication efficiency.

Figure 1:
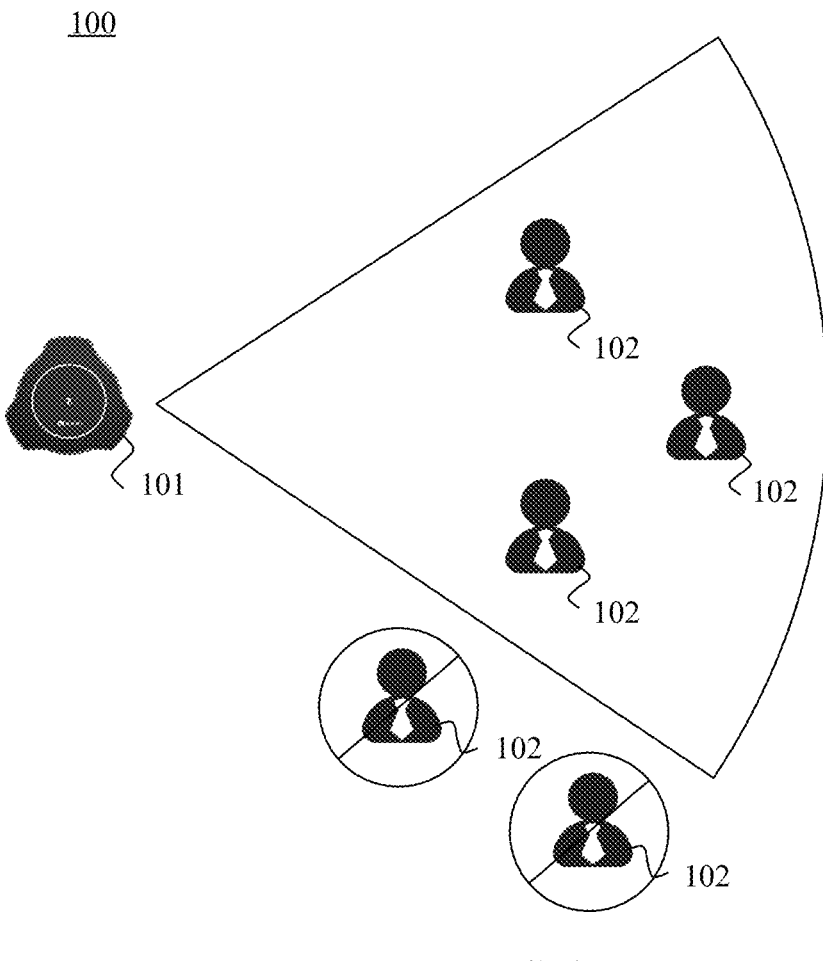
FIG. 1 is a scenario in which a sector sound pickup range is limited by using a fixed beam.

Currently, there are two methods for limiting a sound pickup range by using a fixed beam. FIG. 1 shows a first scenario 100 in which a sector sound pickup range is limited by using the fixed beam. A conference terminal may perform sound pickup in the sector sound pickup range by using a microphone. As shown in FIG. 1, the scenario 100 includes a microphone 101 and participants 102. A quantity of participants 102 in this scenario is merely an example. In the scenario shown in FIG. 1, the sector sound pickup range of the fixed beam may be set for the conference terminal, to pick up sounds of the participants 102 in the sector sound pickup range.

Figure 2:
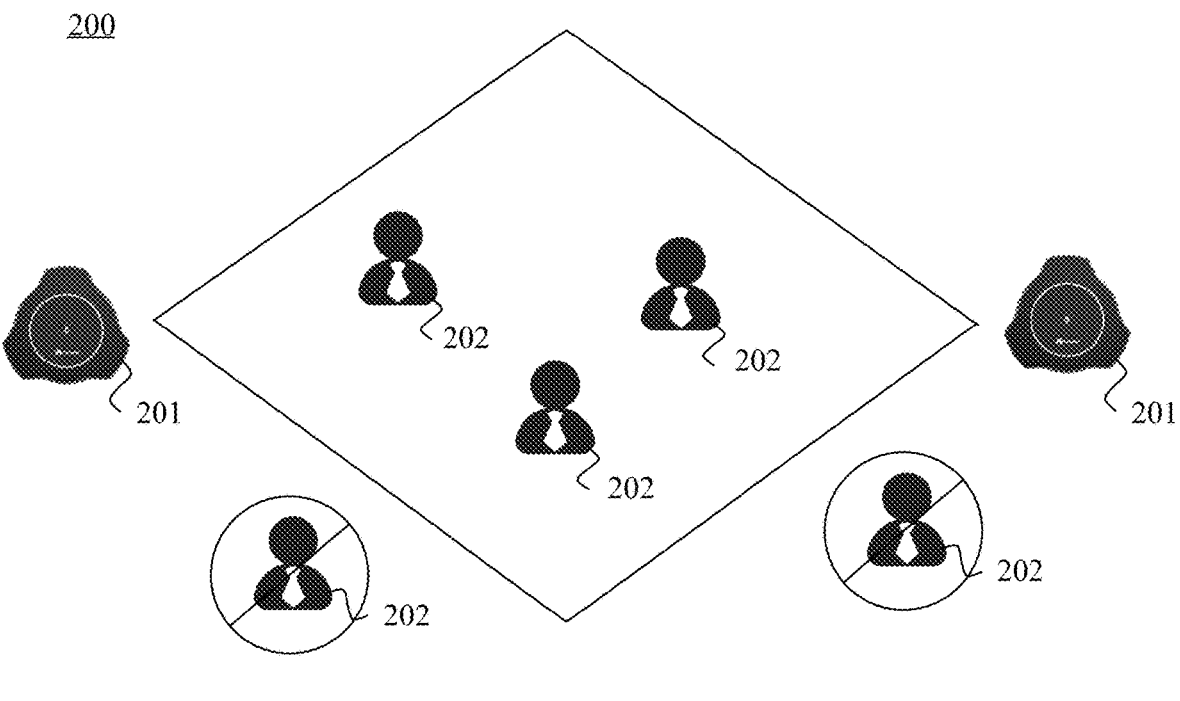
FIG. 2 is another scenario in which a quadrilateral sound pickup range is limited by using a fixed beam.

FIG. 2 shows a second scenario 200 in which a quadrilateral sound pickup range is limited by using the fixed beam. A conference terminal may perform sound pickup in the quadrilateral sound pickup range by using two microphones. As shown in FIG. 2, the scenario 200 includes microphones 201 and participants 202. A quantity of participants 202 in this scenario is merely an example. In the scenario shown in FIG. 2, the quadrilateral sound pickup range of the fixed beam may be set for the conference terminal, to pick up sounds of the participants 202 in the quadrilateral sound pickup range.

It can be learned from FIG. 1 and FIG. 2 that, even if the participants 102 or the participants 202 are not in the sound pickup range or move out of the sound pickup range, according to the methods, only a sound in a fixed sound pickup range is captured, and a sound of a participant outside the sound pickup range is shielded. This affects communication efficiency of a conference.

In view of this, embodiments of the present disclosure provide a sound pickup method and apparatus, so that a person in a field-of-view range of a camera can be monitored by using an image shot by the camera, and a sound pickup range can be flexibly adjusted based on location information of the person, thereby improving sound pickup effect.

An embodiment of the present disclosure provides a sound pickup method 300. The method 300 may be implemented by a sound pickup device including a camera and a microphone. A center of an optical axis of the camera in the sound pickup device is located at a center point of the microphone.

It should be understood that a sector sound pickup range, a quadrilateral sound pickup range, and a rectangular sound pickup range in embodiments of the present disclosure are defined from a top view of a scenario in which the sound pickup device is located.

Figure 3:
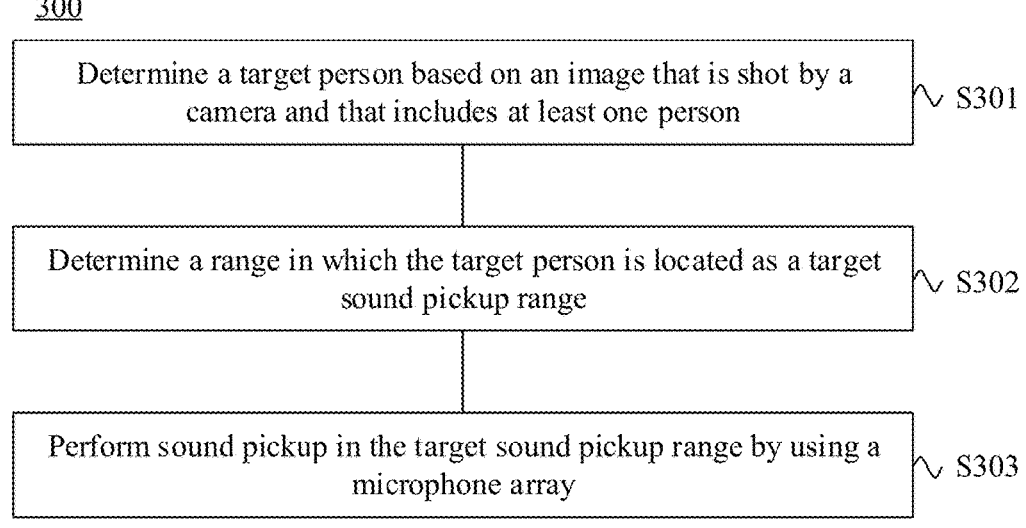
FIG. 3 is a schematic flowchart of a sound pickup method according to an embodiment of the present disclosure.

FIG. 3 shows the sound pickup method 300 according to this embodiment of the present disclosure. According to the method 300, the sector sound pickup range may be flexibly adjusted, and the quadrilateral sound pickup range may also be flexibly adjusted. The method 300 may include the following steps.

S301: Determine a target person based on an image that is shot by the camera and that includes at least one person.

Specifically, the at least one person is a person in a field-of-view range of the camera. The target person is a person whose sound is picked up by using the microphone.

For example, when the sound pickup device works, the camera may shoot a person in a field-of-view range of the camera at a time interval, for example, 1 second or 3 seconds. The time interval is not limited in this embodiment of the present disclosure.

S302: Determine a range in which the target person is located as a target sound pickup range.

Specifically, the target sound pickup range is determined based on a distribution range of the target person.

S303: Perform sound pickup in the target sound pickup range by using the microphone.

Specifically, the sound pickup device may deliver and configure the target sound pickup range to the microphone, and the microphone picks up the sound of the target person in the target sound pickup range.

It should be understood that, if there is no person in the image shot by the camera, the microphone in the sound pickup device is in an off state, that is, sound pickup is not performed.

According to the method provided in this embodiment of the present disclosure, the person in the field-of-view range of the camera may be monitored by using the image shot by the camera, and the target sound pickup range may be determined based on the range in which the target person is located. According to the method, the sound pickup range can be flexibly adjusted based on the person in the field-of-view range, thereby improving sound pickup effect.

In an optional embodiment, S301 may include determining the target person based on angle information of the at least one person relative to the camera and a distance from the at least one person to the camera, where the angle information is determined based on a correspondence between pixel information of the at least one person in the image shot by the camera and a field of view of the camera.

Specifically, each pixel in the image shot by the camera with the field of view of the camera is calibrated for the sound pickup device before delivery. In this case, the sound pickup device may obtain the angle information of the at least one person based on the pixel information of the at least one person in the image shot by the camera. Then, two-dimensional coordinates of the at least one person on a horizontal plane are determined based on the angle information of the at least one person and the distance from the at least one person to the camera. Finally, the target person is determined based on the two-dimensional coordinates of the at least one person relative to the horizontal plane.

Optionally, the sound pickup device may recognize, by using a recognition technology, the at least one person in the image shot by the camera. The recognition technology may be a facial recognition technology, a head recognition technology, or the like.

Optionally, the sound pickup device may determine the target person by using a clustering algorithm and the two-dimensional coordinates of the at least one person relative to the horizontal plane. The clustering algorithm may be a k-means clustering algorithm, a mean shift clustering algorithm, density based clustering algorithm (DBCLA), a maximum expectation clustering algorithm using a Gaussian mixture model, agglomerate hierarchical clustering, a graph community detection algorithm, or the like. This is not limited in this embodiment of the present disclosure.

According to the method provided in this embodiment of the present disclosure, the two-dimensional coordinates of the at least one person relative to the horizontal plane may be determined based on the angle information of the at least one person in the image and information about the distance from the at least one person to the camera, and the target person may be determined based on a distribution range of the two-dimensional coordinates of the at least one person. In this way, a rectangular sound pickup range is flexibly determined based on a range in which two-dimensional coordinates of the target person is located, thereby improving the sound pickup effect.

In this embodiment of the present disclosure, the distance from the at least one person to the camera may be obtained in two different manners.

In a possible implementation, the image shot by the camera may include a first image and a second image, and both the first image and the second image include the at least one person. The method 300 may further include: determining a difference between coordinates of the at least one person in the first image and the second image as parallax of the at least one person, and determining the distance from the at least one person to the camera based on the parallax of the at least one person.

It should be understood that the coordinates are horizontal coordinates centered on the optical axis of the camera.

Specifically, the sound pickup device may determine a difference between coordinate values of a same person in different images, namely, the parallax, based on two images that are shot by the camera and that include the at least one person at a same moment, and then determine the distance from the at least one person to the camera by using a similarity triangle principle and the parallax.

According to the method provided in this embodiment of the present disclosure, the distance from the at least one person to the camera may be determined by using two images of the at least one person shot by the camera, so that hardware costs and integration difficulty can be reduced.

In another possible implementation, the distance from the at least one person to the camera is obtained by using a depth sensor.

The depth sensor may be a camera array, a millimeter wave radar, a laser radar, or a structured light sensor. This is not limited in this embodiment of the present disclosure. It should be understood that the depth sensor may alternatively be another device that can measure a distance.

According to the method provided in this embodiment of the present disclosure, the distance from the at least one person to the camera may be determined by using the depth sensor, and no internal calculation is required, thereby reducing calculation complexity, and improving efficiency of determining the sound pickup range. In addition, precision of the sound pickup range may be further improved by using the depth sensor, thereby improving user experience.

Optionally, the at least one person may include two or more persons. The determining the target person based on angle information of the at least one person relative to the camera and a distance from the at least one person to the camera may include: determining the two-dimensional coordinates of the at least one person on the horizontal plane based on the distance from the at least one person to the camera and the angle information; classifying the at least one person into at least two types of persons by using the clustering algorithm and the two-dimensional coordinates; determining distances between the at least two types of persons and a preset central location based on the two-dimensional coordinates of the at least two types of persons; selecting, from the at least two types of persons, a target cluster whose distance from the preset central location is less than or equal to a third threshold and whose quantity of persons is greater than or equal to a fourth threshold; and determining a person in the target cluster as the target person.

The sound pickup device may set a rectangular area whose distance to the camera is M as a central area. A cluster of persons in the central area is an intermediate cluster. The intermediate cluster and a cluster that can be clustered to the intermediate cluster based on angle information are determined as the target cluster, and a person included in the target cluster is determined as the target person.

The preset central location is a location in the central area. For example, the preset central location may be a central location in the central area.

Further, the sound pickup device may first determine the two-dimensional coordinates of the at least one person on the horizontal plane by using the distance from the at least one person to the camera and the angle information; then, cluster the at least one person by using the clustering algorithm and the two-dimensional coordinates, to aggregate the at least one person into the at least two types of persons, and sequentially determine whether a person in the at least two types of persons is in the central area; if there is a person in the central area, determine a cluster in which the person is located as the intermediate cluster; then, sequentially determine whether a distance between a person in another cluster and the person in the intermediate cluster is less than or equal to the third threshold and whether a quantity of persons is greater than or equal to the fourth threshold; and if the condition is met, determine the cluster as the target cluster, and determine the person included in the target cluster as the target person. If the at least one person includes one person, the sound pickup device may determine a distance between the person and the preset central location, and if the distance is less than or equal to the third threshold, determine the person as the target person.

The sound pickup device determines angles of persons between the clusters, and may select persons at edges of the clusters, and calculate a minimum distance between the clusters.

It should be understood that the sound pickup device may cluster the at least one person by using the clustering algorithm and the two-dimensional coordinates. If the at least one person can be aggregated into only one cluster, and there is a person in the central area, the at least one person is determined as the target person.

It should be further understood that the central area, the third threshold, and the fourth threshold may be preset by the sound pickup device.

In an optional embodiment, determining the target person based on the image that is shot by the camera and that includes the at least one person in S301 may include: determining the target person based on location information of the at least one person in the image shot by the camera and angle information of the at least one person relative to the camera, where the location information is pixel information of the at least one person in the image shot by the camera.

Specifically, the sound pickup device determines the angle information of the at least one person relative to the camera based on the pixel information of the at least one person and a correspondence between a pixel and a field of view of the camera, and then determines the target person based on the angle information and a clustering algorithm.

According to the method provided in this embodiment of the present disclosure, the angle information of the at least one person may be determined based on the pixel information of the at least one person in the image, and the target person may be determined based on an angle range of the at least one person, to determine an angle distribution range of the target person, to flexibly determine a sector sound pickup range, thereby improving the sound pickup effect.

Optionally, the at least one person may include two or more persons. The determining the target person based on location information of the at least one person in the image shot by the camera and angle information of the at least one person relative to the camera may include: classifying the at least one person into at least two types of persons by using the clustering algorithm and the angle information; determining angles between the at least two types of persons and a preset central location based on the angle information of the at least two types of persons; selecting, from the at least two types of persons, a target cluster whose angle from the preset central location is less than or equal to a first threshold and whose quantity of persons is greater than or equal to a second threshold; and determining a person in the target cluster as the target person.

The sound pickup device may set an area that is within a horizontal angle of Φ degrees and that is centered on the optical axis of the camera as a central area. A cluster of persons in the central area is an intermediate cluster. The intermediate cluster and a cluster that can be clustered to the intermediate cluster based on angle information are determined as the target cluster, and a person included in the target cluster is determined as the target person.

The preset central location is a location in the central area. For example, the preset central location may be a central location in the central area.

Specifically, the sound pickup device may cluster the at least one person by using the clustering algorithm and the angle information, to aggregate the at least one person into the at least two types of persons; sequentially determine whether a person in the at least two types of persons is in the central area; if there is a person in the central area, determine a cluster in which the person is located as the intermediate cluster; then, sequentially determine whether an angle between a person in another cluster and the person in the intermediate cluster is less than or equal to the first threshold and whether a quantity of persons is greater than or equal to the second threshold; and if the condition is met, determine the cluster as the target cluster, and determine the person included in the target cluster as the target person. If the at least one person includes one person, the sound pickup device may determine an angle between the person and the preset central location, and if the angle is less than or equal to the first threshold, determine the person as the target person.

The sound pickup device determines angles of persons between the clusters, and may select persons at edges of the clusters, and calculate a minimum angle between the clusters.

The sound pickup device may cluster the at least one person by using the clustering algorithm and the angle information. If the at least one person can be aggregated into only one cluster, and there is a person in the central area, the at least one person is determined as the target person.

It should be further understood that the central area, the first threshold, and the second threshold may be preset by the sound pickup device.

In an optional embodiment, before determining the target person, the method 300 further includes obtaining a third image of the at least one person at a first moment and a fourth image of the at least one person at a second moment by using the camera, and determining, based on location information of the at least one person in the third image and the fourth image, that a movement range of the at least one person is less than or equal to a fifth threshold.

Further, the sound pickup device may shoot images of the at least one person at different moments by using the camera, and determine, based on a difference between locations of the at least one person in the images at the different moments, whether the at least one person moves in a large range. If there is a large movement, that is, the movement range of the at least one person is greater than the fifth threshold, images of the at least one person are continued to be shot at different moments by using the camera. If there is small movement, that is, the movement range of the at least one person is less than or equal to the fifth threshold, it is determined that the movement range of the at least one person is basically stable. In this case, the target person is determined based on the images that are shot by the camera and that include the at least one person, the range in which the target person is located is determined as the target sound pickup range, and sound pickup is performed on the sound of the target person by using the microphone.

If the movement range of the at least one person is less than or equal to the fifth threshold, the sound pickup device may determine the target person based on the third image, or the fourth image, or the image that is shot by the camera and that includes the at least one person.

The fifth threshold may be an angle or a distance. If the difference between the locations of the at least one person in the images at the different moments is measured by using angle information, a dimension of the fifth threshold is degree. If the difference between the locations of the at least one person in the images at the different moments is measured by using distance information, a dimension of the fifth threshold is a length unit.

According to the sound pickup method provided in this embodiment of the present disclosure, a person with big movement may be excluded based on location information of the at least one person in the images at different moments. This helps determine the target person, flexibly adjust the sound pickup range, and improve the sound pickup effect.

Optionally, before determining the range in which the target person is located as the target sound pickup range, the method further includes determining a candidate sound pickup range based on the range in which the target person is located, and comparing the candidate sound pickup range with a sound pickup range configured on the sound pickup device; and determining that an amplitude of a difference between the candidate sound pickup range and the sound pickup range configured on the sound pickup device is greater than or equal to a sixth threshold.

The sound pickup range configured on the sound pickup device may be an initial default value, or may be a previously determined target sound pickup range.

When an amplitude of a change between the candidate sound pickup range and the target sound pickup range configured on the sound pickup device is greater than or equal to the sixth threshold, the sound pickup device uses the candidate sound pickup range as a new target sound pickup range. If the amplitude of the change between the candidate sound pickup range and the target sound pickup range configured on the sound pickup device is less than the sixth threshold, no additional processing is performed.

According to the sound pickup method provided in this embodiment, the sound pickup range may be adjusted when it is determined that an error of an originally configured sound pickup range is large due to a location change of the target person. In this way, the sound pickup device does not frequently determine the sound pickup range, thereby helping reduce calculation costs and improve efficiency of adjusting the sound pickup range.

Optionally, the sound pickup device may further provide a shot image for the at least one person by using the camera, receive a sound pickup range selected by the at least one person, and perform sound pickup in the sound pickup range by using the microphone.

Further, the sound pickup device may provide the at least one person with an image shot by using the camera, and the at least one person may independently select a sound pickup range in the image. Sound pickup is performed in the sound pickup range by using the microphone.

For example, for a sound pickup device including a camera and a microphone, the sound pickup device may provide at least one person with an image shot by using the camera, and the at least one person may select a continuous area on the image by using an interaction interface. The sound pickup device may determine a sector sound pickup range based on an angle corresponding to a boundary of the area, and pick up a sound in the sector sound pickup range by using the microphone. For a sound pickup device including a camera, a microphone, and a depth sensor, the sound pickup device may provide at least one person with a three-dimensional image shot by using the camera, and the at least one person may select a horizontal rectangular area on the three-dimensional image by using an interaction interface. The sound pickup device may determine a rectangular sound pickup range based on vertex coordinates corresponding to the area, and pick up a sound in the rectangular sound pickup range by using the microphone.

After the at least one person selects the area and the sound pickup device determines the sound pickup range, the sound pickup device does not flexibly adjust the sound pickup range, and the sound pickup range is stored in the sound pickup device as a default configuration.

According to the sound pickup method provided in this embodiment of the present disclosure, a graphical interaction interface is provided for the at least one person, and the sound pickup range can be intuitively and conveniently configured by the at least one person, so that efficiency of determining the sound pickup range can be improved.

Optionally, the sound pickup device may further select the target person from the at least one person by using a human eye tracking technology. For example, whether the at least one person is the target person may be determined by using the human eye tracking technology, to enhance robustness of flexibly adjusting the sound pickup range.

The following describes embodiments of the present disclosure in detail with reference to FIG. 4 to FIG. 7 by using an example in which the sound pickup device is a conference terminal including a monocular camera and a microphone.

FIG. 4 shows a sound pickup method 400 according to an embodiment of the present disclosure.

The method 400 may include the following steps.

S401: Obtain an image shot by using the monocular camera.

The image includes persons who enter a shooting range of the monocular camera.

S402: Recognize facial information of the persons in the image by using a facial recognition technology.

For example, the conference terminal may use rectangular boxes to frame faces of the persons in the image by using the facial recognition technology.

Optionally, to ensure that these persons are in an appropriate distance range of the conference terminal, a pixel size of the face framed by the rectangular box needs to be greater than a seventh threshold, and the seventh threshold may be preset before delivery of the conference terminal.

S403: Determine location information of the persons based on the facial information of the persons in the image.

Further, the conference terminal may use pixel information of centers of the face rectangular boxes of the persons in the image as the location information of the persons. The pixel information may be coordinate values. To be specific, a coordinate system is established in the foregoing image, and pixel coordinate values of the persons in the image are obtained as the location information of the persons. The pixel coordinate value is a value on a coordinate axis in a horizontal direction centered on an optical axis of the camera. It should be understood that a location of an origin of the coordinate system may be any location. This is not limited in the present disclosure.

S404: Determine angle information of the persons relative to the monocular camera based on the location information of the persons.

Specifically, the angle information is determined based on a correspondence between the location information of the persons and a field of view of the monocular camera. If the correspondence between the location information and the field of view of the monocular camera is F(x), where x is the location information, the location information of the persons is sequentially brought into F(x), so that the angle information of the persons relative to the monocular camera can be obtained.

The location information of the persons is locations in the horizontal direction using the optical axis of the camera as an axis. Therefore, the angle information is also angles in the horizontal direction using the optical axis of the camera as the axis.

Figure 5:
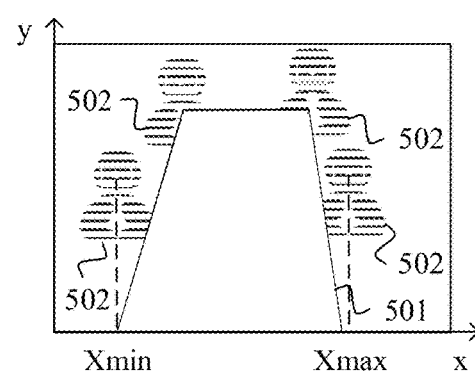
FIG. 5 is a schematic diagram of face center location information according to an embodiment of the present disclosure.

For example, FIG. 5 shows an image shot by the monocular camera. The image includes a desk 501 and four persons 502. The conference terminal may use rectangular boxes to frame faces of the four persons 502 in the image by using the facial recognition technology. To be specific, four white rectangular boxes are used to frame the faces of the four persons 502 in FIG. 5, and then locations of centers of the rectangular boxes are used as pixel locations of the four persons 502. In other words, four white dots are used to illustrate the pixel locations of the four persons 502 in FIG. 5, and the pixel locations of the four persons 502 in the image may be obtained. The conference terminal may establish a coordinate system by using the lower left corner of the image as an origin, and a coordinate axis in the horizontal direction using the optical axis of the camera as the axis is set to an x axis, so that pixel coordinate values of the four persons 502 in the image may be obtained. The pixel coordinate values of the four persons 502 in the image are used as location information of the four persons 502. If a correspondence between the location information and the field of view of the monocular camera is F(x), the pixel coordinate values of the four persons 502 are sequentially brought into F(x), to obtain angle information of the four persons 502 relative to the monocular camera.

Optionally, the conference terminal may determine, based on the location information of the persons in the image, a location range including the persons.

For example, in FIG. 5, a person 502 with a minimum coordinate value Xmin and a person 502 with a maximum coordinate value Xmax may be determined based on the pixel coordinate values of the four persons 502. Then, a sector range centered on the monocular camera O and bounded by a straight line OXmin and a straight line OXmax may be determined based on angle information of the person 502 with the minimum coordinate value Xmin and the person 502 with the maximum coordinate value Xmax. The sector range may include the four persons 502.

S405: Determine participants from the persons based on the angle information of the persons in the image relative to the monocular camera and a clustering algorithm.

The conference terminal may determine location distribution of the persons based on the angle information of the persons in the image relative to the monocular camera and the clustering algorithm, to determine the participants from the persons.

The conference terminal determines the participants in two implementations.

In a first possible implementation, the conference terminal may classify the persons in the image into N clusters by using the clustering algorithm, where 1≤N≤3. The conference terminal presets an area that is within a horizontal angle of 60 degrees and that is centered on the optical axis of the monocular camera as a central area. A cluster of persons in the central area is an intermediate cluster. The intermediate cluster and a cluster that can be clustered to the intermediate cluster based on angle information are determined as the target cluster, and a person included in the target cluster is determined as the participant.

A condition that needs to be met by a cluster that is clustered to the target cluster based on angle information may be: An angle between the cluster and the intermediate cluster is less than or equal to a first threshold, and a quantity of persons in the cluster is greater than or equal to a second threshold. The first threshold and the second threshold are preset before delivery of the conference terminal.

In a second possible implementation, the conference terminal may classify the persons in the image into N clusters by using the clustering algorithm, where 1≤N≤3. The conference terminal may determine a person with a maximum angle based on the angle information, and determine a cluster that includes the person with the maximum angle as a peripheral cluster. If an angle between the peripheral cluster and a cluster closest to the peripheral cluster is greater than or equal to an eighth threshold, and a quantity of persons in the peripheral cluster is less than or equal to a ninth threshold, the peripheral cluster is excluded as a non-target cluster. Then, other clusters are sequentially determined according to this step, to obtain a cluster that does not meet the condition as the target cluster.

S406: Determine a range in which the participants are located as a target sound pickup range.

Specifically, the conference terminal may determine, in the participants based on location information of the participants in the image, a participant at a maximum location and a participant at a minimum location in the horizontal direction centered on the optical axis of the monocular camera. Further, the target sound pickup range, namely, a sector sound pickup range, is determined based on angle information corresponding to the participant at the maximum location and angle information corresponding to the participant at the minimum location. The conference terminal may establish a coordinate system, and determine a size of a location of a participant by using a value on a coordinate axis.

Figure 6:
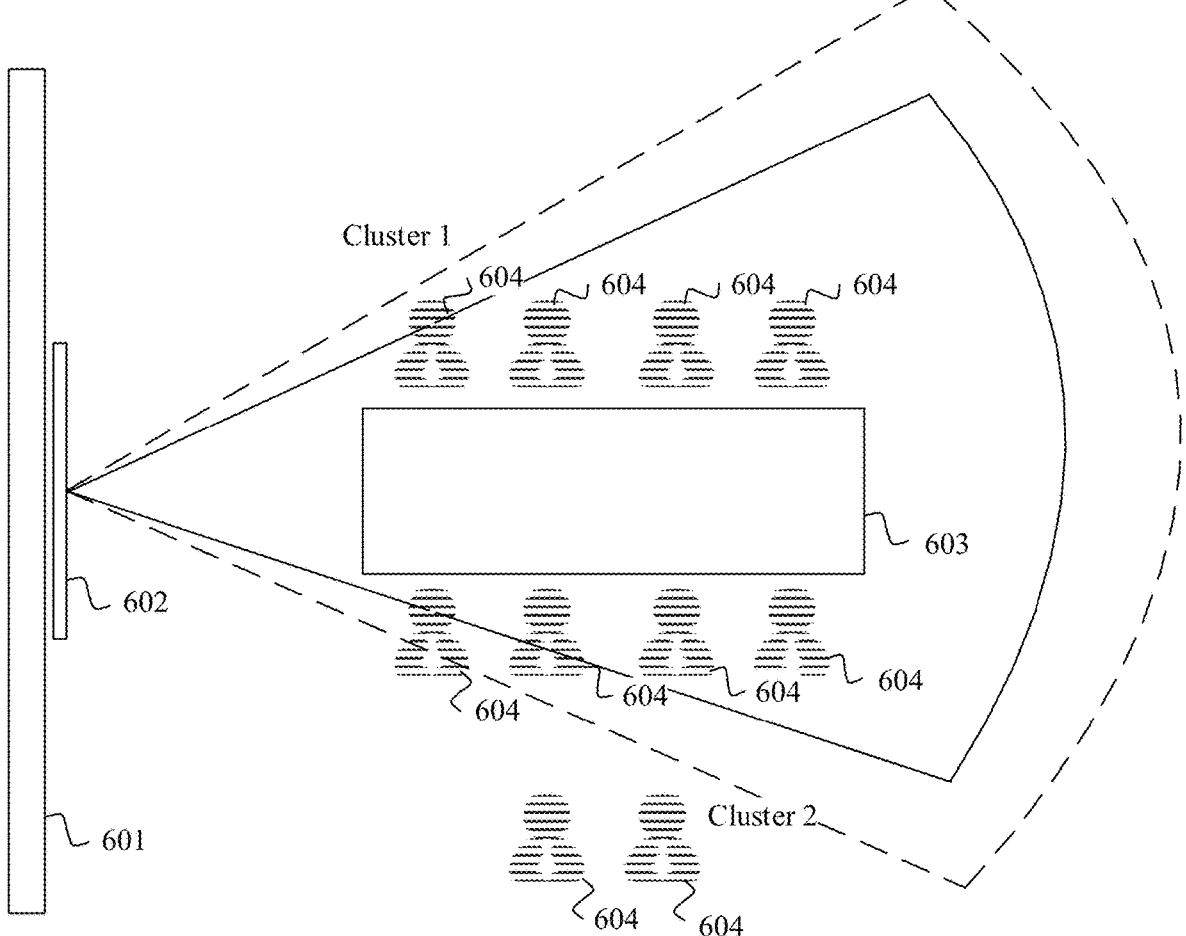
FIG. 6 is a schematic diagram of a sector sound pickup range according to an embodiment of the present disclosure.

For example, FIG. 6 is a schematic diagram of the sector sound pickup range. A wall 601, a conference terminal 602, a conference table 603, and a person 604 are included in the figure. It should be understood that a quantity of persons 604 is merely an example. The conference terminal 602 aggregates the persons 604 into a cluster 1 and a cluster 2 according to the clustering algorithm; determines the cluster 1 as a target cluster based on angle information, and determines persons 604 in the target cluster as participants; and determines, based on location information of the participants, a participant at a maximum location and a participant at a minimum location in the horizontal direction centered on the optical axis of the monocular camera. The locations of the two participants are shown by white dots in FIG. 6, and the target sound pickup range is determined based on the locations of the two participants. A sector range of solid lines in FIG. 6 is the sound pickup range.

Optionally, to prevent a calculation error and to ensure that sound pickup can be performed on the participants in the target cluster, a redundancy amount may be added to a boundary angle based on the determined target sound pickup range, and the range added with the redundancy amount is used as a final sound pickup range. A sector area of dashed lines in FIG. 6 is the final sound pickup range.

S407: Perform sound pickup in the target sound pickup range by using the microphone.

According to the method provided in this embodiment of the present disclosure, pixel information of each person in the image may be recognized by using the facial recognition technology, and the angle information may be determined based on the pixel information. Then, the participants are determined by using the clustering algorithm and the angle information. Finally, the range in which the participants are located is determined as the sound pickup range. According to the method, the range in which the participants are located can be recognized based on the image shot by the monocular camera, and the sector sound pickup range can be flexibly determined, thereby improving sound pickup effect.

Figure 7:
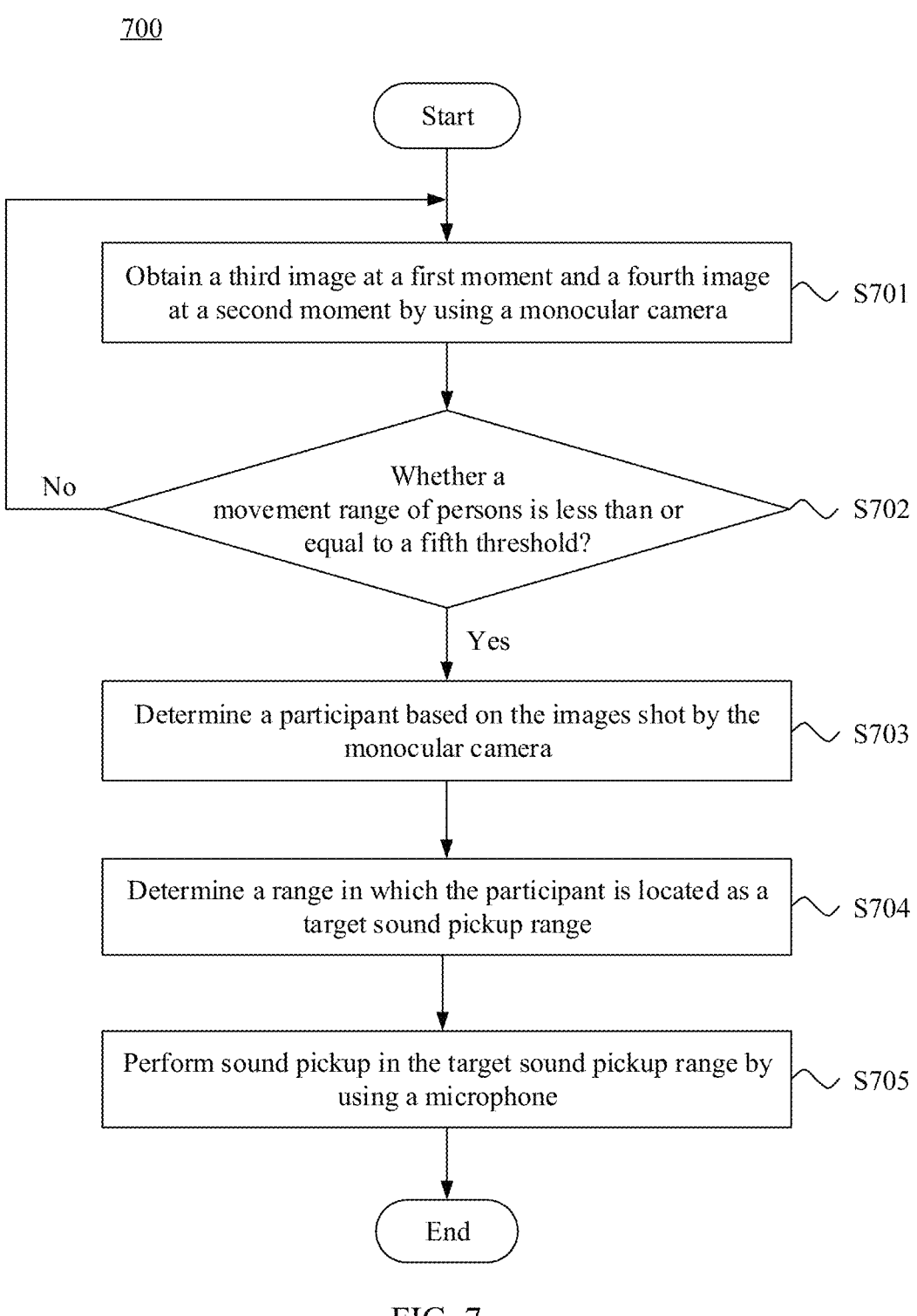
FIG. 7 is a schematic flowchart of another sound pickup method according to an embodiment of the present disclosure.

FIG. 7 shows another method 700 for adjusting a sound pickup range in real time according to an embodiment of the present disclosure. The method 700 may include the following steps.

S701: Obtain a third image at a first moment and a fourth image at a second moment by using the monocular camera.

It should be understood that the third image includes persons who enter the shooting range of the monocular camera at the first moment. The fourth image includes persons who enter the shooting range of the monocular camera at the second moment.

Specifically, a time interval between the first moment and the second moment is, for example, 1 second or 3 seconds. This is not limited in the present disclosure.

For example, the conference terminal may shoot, at the first moment by using the monocular camera, each person in a field-of-view range of the monocular camera, to obtain the third image of each person. After an interval of 1 second, each person in the field-of-view range of the monocular camera is shot at the second moment, to obtain the fourth image of each person.

S702: Determine whether a movement range of the persons is less than or equal to a fifth threshold.

There may be two implementations for determining whether a movement range of persons who appear in both the third image and the fourth image is less than or equal to the fifth threshold.

In a first possible implementation, the conference terminal may determine location information of the persons in the third image and the fourth image, namely, pixel coordinate values of the persons in the third image and the fourth image. A difference between pixel coordinate values of a person in the two images is used as a movement range of the person, to further determine whether the movement range of the person is less than or equal to the fifth threshold.

In a second possible implementation, the conference terminal may determine location information of the persons in the third image and the fourth image, namely, pixel coordinate values of the persons in the third image and the fourth image. Then, angle values of a person in the two images are determined based on a relationship between the pixel coordinate values and the field of view of the monocular camera. Finally, a difference between the angle values of the person in the two images is used as a movement range of the person, to further determine whether the movement range of the person is less than or equal to the fifth threshold. For example, the threshold may be 5 degrees.

In the foregoing two implementations, values and dimensions of the fifth threshold may be different. In addition, if some persons appear in the fourth image but do not appear in the third image, it may be determined that a movement range of these persons exceeds the fifth threshold. Alternatively, if some persons appear in the third image but do not appear in the fourth image, it may also be determined that a movement range of these persons exceeds the fifth threshold. A specific algorithm may be set based on an actual situation. This is not limited in the present disclosure.

If the movement range of the persons in the shooting range of the camera is less than or equal to the fifth threshold, S703 is performed. If the movement range of the persons is greater than the fifth threshold, S701 is returned to.

S703: Determine participants based on the images shot by the monocular camera.

It may be understood that, when the persons in the shooting range of the camera tend to be stable, the participants are determined based on the images shot by the monocular camera. For a specific implementation process, refer to S402 to S405 in the foregoing embodiment. Details are not described herein again.

S704: Determine a range in which the participants are located as a target sound pickup range.

Specifically, the conference terminal determines, based on the determined participants, the range in which the participants are located as the target sound pickup range.

S705: Perform sound pickup in the target sound pickup range by using the microphone.

According to the sound pickup method provided in this embodiment of the present disclosure, a person with big movement may be excluded based on location information of the persons in the images at different moments. This helps determine the participants, flexibly adjust the sound pickup range based on the participants, and improve the sound pickup effect. In addition, in the method, S701 to S705 may be performed periodically, to flexibly adjust the sound pickup range based on situations at different moments.

Optionally, because the participants may change at any time, between S703 and S704, the method may further include: determining a range in which the participants are located as a candidate sound pickup range, and comparing the candidate sound pickup range with a sound pickup range configured on the sound pickup device; and determining whether an amplitude of a change between the two is greater than or equal to a sixth threshold.

It should be understood that the sound pickup range configured on the sound pickup device may be an initial default value. In a subsequent process, as the target sound pickup range is determined, the target sound pickup range is configured on the sound pickup device. In this case, it may be understood that the sound pickup range configured on the sound pickup device herein may be an initial default value, or may be a previously determined target sound pickup range.

When the amplitude of the change between the candidate sound pickup range and the sound pickup range configured on the sound pickup device is greater than or equal to the sixth threshold, the candidate sound pickup range is used as a new target sound pickup range. If the amplitude of the change between the candidate sound pickup range and the target sound pickup range configured on the sound pickup device is less than the sixth threshold, no additional processing is performed. For a method for determining the candidate sound pickup range, refer to the manner of determining the target sound pickup range. Details are not described herein again.

It can be learned that, in this embodiment, the sound pickup range may be further adjusted when it is determined that an error of an originally configured sound pickup range is large due to a location change of the participants. In this way, the sound pickup device does not frequently determine the sound pickup range, thereby helping reduce calculation costs and improve efficiency of adjusting the sound pickup range.

The following describes embodiments of the present disclosure in detail with reference to FIG. 8 to FIG. 12 by using an example in which the sound pickup device is a conference terminal including a binocular camera and two microphones.

An embodiment of the present disclosure provides a sound pickup method 800. The method 800 is implemented by the conference terminal including a binocular camera and two microphones. FIG. 8 shows a sound pickup method 800 according to an embodiment of the present disclosure. The method 800 may include the following steps.

S801: Obtain two images shot by using the binocular camera.

The two images include persons who enter a shooting range of the binocular camera.

Further, the binocular camera includes a left camera and a right camera. Therefore, the conference terminal may obtain, by using the binocular camera, two images that include persons in respective shooting ranges.

S802: Recognize facial information of the persons in the two images by using a facial recognition technology.

Further, the conference terminal may separately use a rectangular box to frame a face of each person in the two images by using the facial recognition technology.

Optionally, to ensure that each person is in an appropriate distance range of the conference terminal, a pixel size of the face framed by the rectangular box needs to be greater than a tenth threshold, and the tenth threshold is preset before delivery of the conference terminal.

S803: Determine location information of the persons based on the facial information of the persons in the two images.

Further, the conference terminal may use pixel information of centers of the face rectangular boxes of the persons as the location information of the persons. The pixel information may be coordinate values. To be specific, a coordinate system is established in the two images, and pixel coordinate values of the persons in the two images are obtained as the location information of the persons in the two images. The pixel coordinate value is a value on a coordinate axis in a horizontal direction centered on an optical axis of the camera. It should be understood that a location of an origin of the coordinate system may be any location. This is not limited in the present disclosure.

S804: Determine distances from the persons to the binocular camera based on the location information of the persons in the two images.

Further, a difference between locations of a same person in the two images is parallax, and a distance from the person to the binocular camera may be obtained based on the parallax. According to this method, the distances from the persons to the binocular camera can be obtained.

Figure 9:
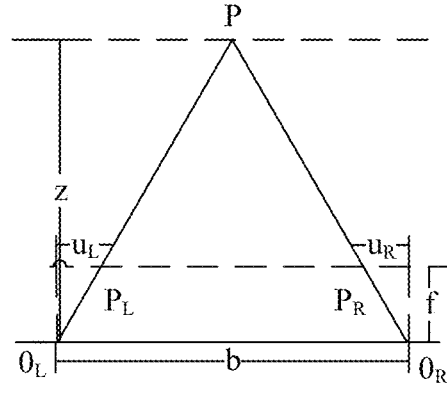
FIG. 9 is a schematic diagram of a ranging principle of a binocular camera.

For example, as shown in FIG. 9, P is one of the persons, OL is an aperture center of the left camera, OR is an aperture center of the right camera, a length b of a line segment OLOR is a distance between centers of the two cameras, a plane on which a straight line PLPR is located is an imaging plane, PL is an imaging point of the person P on the left camera, PR is an imaging point of the person P on the right camera, f is a focal length of the binocular camera, uL and uR are points of the person P on the imaging plane, and z is a distance between the person P and the camera. According to the principle of similar triangles, the following may be obtained:

$$z = \frac{f^* b}{u_L - u_R}$$

S805: Determine angle information of the persons based on location information of the persons in either of the two images.

Further, the angle information is determined based on a correspondence between the location information and a field of view of the binocular camera. If the correspondence between the location information and the field of view of the binocular camera is F(x), where x is the location information, either image is selected from the two images, and location information of each person in the image is sequentially brought into F(x), so that the angle information of the persons relative to the binocular camera can be obtained.

S806: Determine, based on the distances from the persons to the binocular camera and the angle information of the persons, two-dimensional coordinates of the persons parallel to a horizontal plane.

Further, the conference terminal may obtain, based on a trigonometric function relationship, the coordinates of the persons parallel to the horizontal plane.

Figure 10:
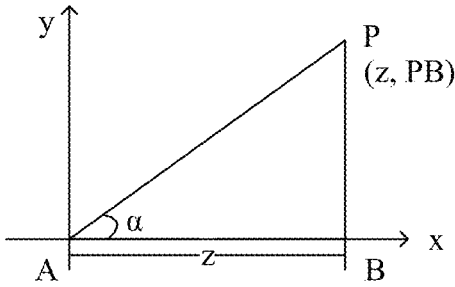
FIG. 10 is a schematic diagram of determining two-dimensional coordinates of a person by a binocular camera.

For example, FIG. 10 is a schematic diagram of determining, by the conference terminal, the coordinates of the persons parallel to the horizontal plane. In FIG. 10, P is one of the persons, A is the binocular camera, a length z of a line segment AB is a distance from the person P to the binocular camera A, an angle α is an angle of the person P relative to the binocular camera A. A length of PB may be obtained according to the formula PB=z tan α. If a coordinate system parallel to the horizontal plane is established by using A as an origin, two-dimensional coordinates of the person P may be obtained.

S807: Determine participants from the persons based on the two-dimensional coordinates of the persons parallel to the horizontal plane and a clustering algorithm.

The conference terminal may determine location distribution of the persons based on the two-dimensional coordinates of the persons parallel to the horizontal plane and the clustering algorithm, to determine the participants from the persons.

The conference terminal determines the participants in two implementations.

In a first possible implementation, the conference terminal may classify the persons in the image into N clusters by using the clustering algorithm, where $1 \leq N \leq 3$. The conference terminal presets an area that is within a horizontal angle of 60 degrees and that is centered on the optical axis of the binocular camera as a central area. A cluster of persons in the central area is an intermediate cluster. The intermediate cluster and a cluster that can be clustered to the intermediate cluster based on two-dimensional coordinates are determined as the target cluster, and a person included in the target cluster is determined as the participant.

A condition that needs to be met by a cluster that is clustered to the target cluster based on two-dimensional coordinates may be: A distance between the cluster and the intermediate cluster is less than or equal to a third threshold, and a quantity of persons in the cluster is greater than or equal to a fourth threshold. It should be understood that the third threshold and the fourth threshold are preset before delivery of the conference terminal.

In a second possible implementation, the conference terminal may classify the persons in the image into N clusters by using the clustering algorithm, where $1 \leq N \leq 3$. The conference terminal may determine a person with a maximum angle based on the angle information, and determine a cluster that includes the person with the maximum angle as a peripheral cluster. If an angle between the peripheral cluster and a cluster closest to the peripheral cluster is greater than or equal to an eleventh threshold, and a quantity of persons in the peripheral cluster is less than or equal to a twelfth threshold, the peripheral cluster is excluded as a non-target cluster. Then, other clusters are sequentially determined according to this step, to obtain a cluster that does not meet the condition as the target cluster.

S808: Determine a range in which the participants are located as a target sound pickup range.

Further, the conference terminal may determine, in the participants based on two-dimensional coordinates of the participants in the image, a person with maximum coordinates and a person with minimum coordinates in the horizontal direction and a person with maximum coordinates and a person with minimum coordinates in a vertical direction, where the horizontal direction and the vertical direction are centered on the optical axis of the binocular camera.

Then, the target sound pickup range, namely, a rectangular sound pickup range is determined based on the coordinates corresponding to the four persons.

Figure 11:
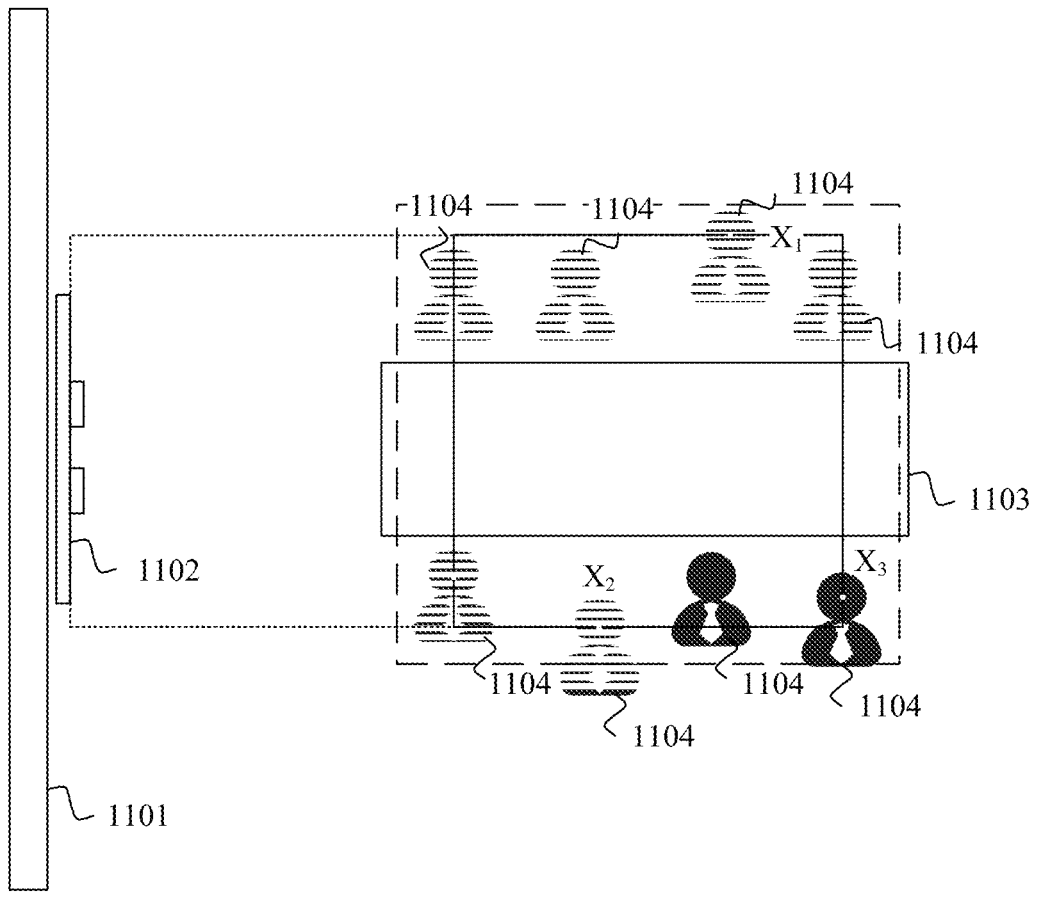
FIG. 11 is a schematic diagram of a rectangular sound pickup range according to an embodiment of the present disclosure.

For example, FIG. 11 is a schematic diagram of determining the rectangular sound pickup range by the conference terminal. A wall 1101, a conference terminal 1102, a conference table 1103, and participants 1104 are included in the figure. It should be understood that a quantity of participants 1104 is merely an example. The conference terminal 1102 determines, based on location information of the participants 1104 in the target cluster, a participant 1104 with maximum coordinates and a participant 1104 with minimum coordinates in the horizontal direction and a participant 1104 with maximum coordinates and a participant 1104 with minimum coordinates in the vertical direction, where the horizontal direction and the vertical direction are centered on the optical axis of the binocular camera. Locations of the four participants 1104 are shown by white dots in FIG. 11. The target sound pickup range is determined based on the four locations. A rectangular range of solid lines in FIG. 11 is the target sound pickup range.

Optionally, to prevent a calculation error and to ensure that sound pickup can be performed on the participants in the target cluster, the conference terminal may add a redundancy amount to a boundary angle based on the determined target sound pickup range, and the range added with the redundancy amount is used as the target sound pickup range. For example, in FIG. 11, the redundant amount is added to the rectangular sound pickup range of solid lines, to become a rectangular range formed by short lines, and the conference terminal 1102 may use the rectangular range formed by short lines as the target sound pickup range.

Optionally, if the conference terminal has a whiteboard function, that is, the conference terminal may support the participant to perform operations such as tapping, double-tapping, and right-tapping, the sound pickup device needs to pick up a sound of a person around the sound pickup device. In this case, a plane on which the sound pickup device is located may be used as a boundary of the target sound pickup range. For example, in FIG. 11, the conference terminal 1102 has a whiteboard function, and the target sound pickup range may be a rectangular area including a plane on which the conference terminal 1102 is located, a participant (X1) 1104, a participant (X2) 1104, and a participant (X3) 1104, namely, a rectangular range formed by dots and lines in the figure. It should be understood that the conference terminal 1102 may add the redundancy amount to the rectangular range, to prevent a calculation error and ensure that the conference terminal 1102 can perform sound pickup on the participants in the target cluster.

S809: Perform sound pickup in the target sound pickup range by using the microphone.

According to the method provided in this embodiment of the present disclosure, distances from persons in an image to the binocular camera may be determined by using the image shot by the binocular camera. Then, angle information of the persons is determined by using location information of the persons in the image. Then, based on the distances from the persons to the binocular camera and the angle information of the persons, two-dimensional coordinates of the persons parallel to the horizontal plane are determined. Finally, the participants are obtained according to the clustering algorithm, and an appropriate rectangular sound pickup range is determined based on two-dimensional coordinates of the participants parallel to the horizontal plane. According to the method, the rectangular sound pickup range can be flexibly determined, thereby improving sound pickup effect.

In the foregoing method 800, a method in which the binocular camera shoots two images is used, and the distances from the persons in the two images to the binocular camera are determined based on parallax of the two images. In another possible implementation, a depth sensor may alternatively be used to obtain a distance from a person in an image to the camera. The camera may be any camera having a shooting function.

According to the method provided in this embodiment of the present disclosure, no internal calculation is required, thereby reducing calculation complexity, and improving efficiency of determining the sound pickup range. In addition, precision of the sound pickup range may be further improved by using the depth sensor, thereby improving user experience.

Figure 12:
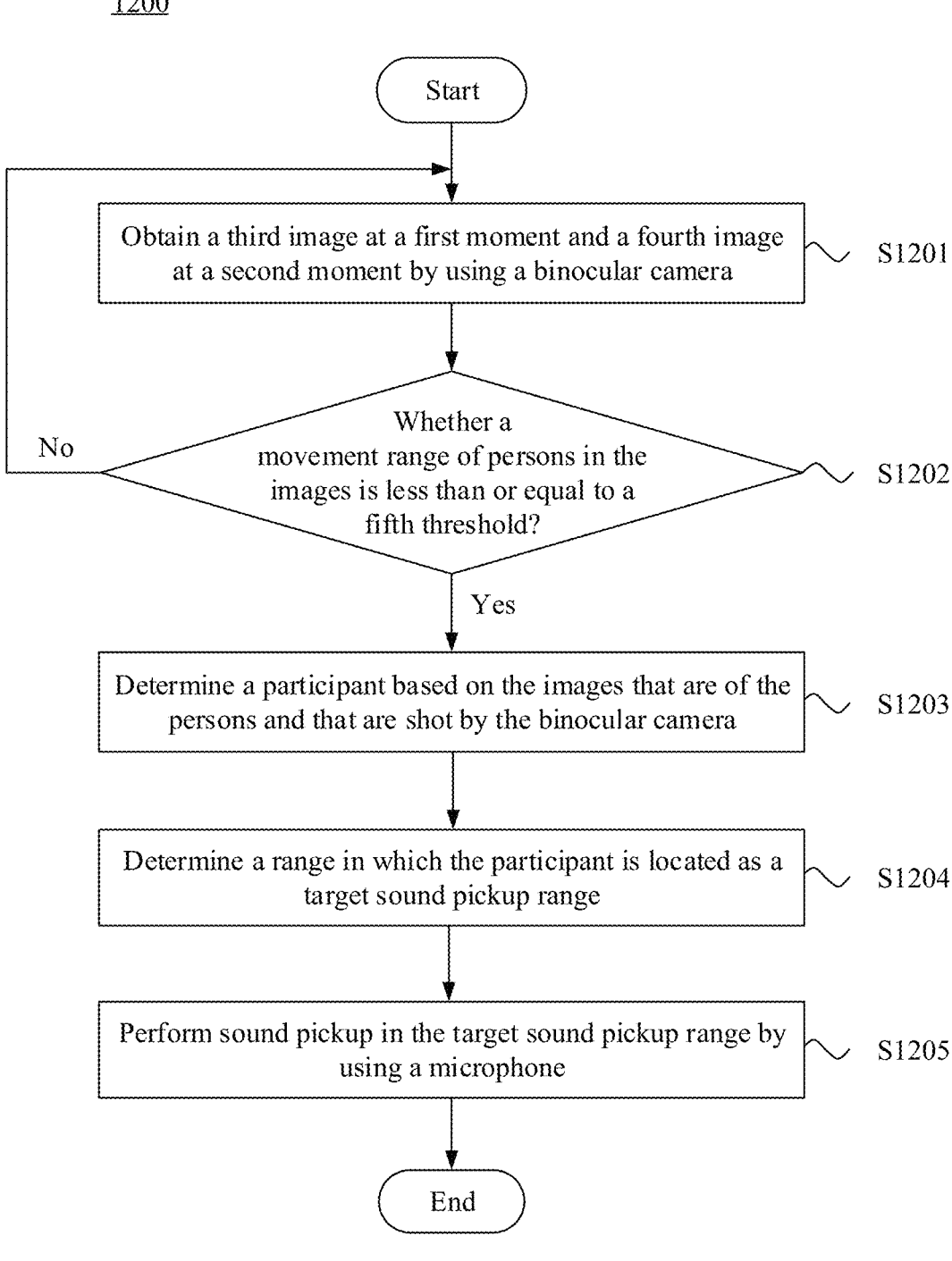
FIG. 12 is a schematic flowchart of another sound pickup method according to an embodiment of the present disclosure.

FIG. 12 shows another method 1200 for adjusting a sound pickup range in real time according to an embodiment of the present disclosure. The method 1200 may include the following steps.

S1201: Obtain a third image at a first moment and a fourth image at a second moment by using the binocular camera.

Further, the binocular camera may shoot two images at the first moment, and the conference terminal may obtain either image as the third image; and the binocular camera may shoot two more images at the second moment, and the conference terminal obtains an image corresponding to the third image from the two images.

S1202: Determine whether a movement range of the persons in the image is less than or equal to a fifth threshold.

There may be three implementations for determining whether a movement range of persons who appear in both the third image and the fourth image is less than or equal to the fifth threshold.

In a first possible implementation, the conference terminal may determine location information of the persons in the third image and the fourth image, namely, pixel coordinate values of the persons in the third image and the fourth image. A difference between the pixel coordinate values of the persons in the two images is used as the movement range of the persons, to further determine whether the movement range of the persons is less than or equal to the fifth threshold.

In a second possible implementation, the conference terminal may determine location information of the persons in the third image and the fourth image, namely, pixel coordinate values of the persons in the third image and the fourth image. Then, angle values of the persons in the two images are determined based on a relationship between the pixel coordinate values and the field of view of the binocular camera. Finally, a difference between the angle values of the persons in the two images is used as the movement range of the persons, to further determine whether the movement range of the persons is less than or equal to the fifth threshold.

In a third possible implementation, the conference terminal uses a difference between distances from the persons in the third image to the binocular camera and distances from the persons in the fourth image to the binocular camera as the movement range of the persons, to further determine whether the movement range of the persons is less than or equal to the fifth threshold.

In the foregoing three implementations, values and dimensions of the fifth threshold may be different. In addition, if some persons appear in the fourth image but do not appear in the third image, it may be determined that a movement range of these persons exceeds the fifth threshold. Alternatively, if some persons appear in the third image but do not appear in the fourth image, it may also be determined that a movement range of these persons exceeds the fifth threshold. A specific algorithm may be set based on an actual situation. This is not limited in the present disclosure.

If the movement range of the persons in the shooting range of the camera is less than or equal to the fifth threshold, S1203 is performed. If the movement range of the persons is greater than the fifth threshold, S1201 is returned to.

S1203: Determine participants based on the images that are of the persons and that are shot by the binocular camera.

It may be understood that, when the persons in the shooting range of the camera tend to be stable, the participants are determined based on the images shot by the binocular camera. The conference terminal may determine the participants by using the fourth image shot by the binocular camera, or may determine the participants by using an image shot immediately after the fourth image. For a specific implementation process, refer to S802 to S807 in the foregoing embodiment. Details are not described herein again.

S1204: Determine a range in which the participants are located as a target sound pickup range.

Further, the conference terminal determines, based on the determined participants, the range in which the participants are located as the target sound pickup range.

S1205: Perform sound pickup in the target sound pickup range by using the microphone.

According to the sound pickup method provided in this embodiment of the present disclosure, a person with big movement may be excluded based on location information of the persons in the images at different moments. This helps determine the participants, flexibly adjust the sound pickup range based on the participants, and improve the sound pickup effect. In addition, in the method, S1201 to S1205 may be performed periodically, to flexibly adjust the sound pickup range based on situations at different moments.

Optionally, because the participants may change at any time, between S1203 and S1204, the method may further include determining a range in which the participants are located as a candidate sound pickup range, and comparing the candidate sound pickup range with a sound pickup range configured on the sound pickup device; and determining whether an amplitude of a change between the two is greater than or equal to a sixth threshold.

The sound pickup range configured on the sound pickup device may be an initial default value. In a subsequent process, as the target sound pickup range is determined, the target sound pickup range is configured on the sound pickup device. In this case, it may be understood that the sound pickup range configured on the sound pickup device herein may be an initial default value, or may be a previously determined target sound pickup range.

When the amplitude of the change between the candidate sound pickup range and the sound pickup range configured on the sound pickup device is greater than or equal to the sixth threshold, the candidate sound pickup range is used as a new target sound pickup range. If the amplitude of the change between the candidate sound pickup range and the target sound pickup range configured on the sound pickup device is less than the sixth threshold, no additional processing is performed. For a method for determining the candidate sound pickup range, refer to the manner of determining the target sound pickup range.

In this embodiment, the sound pickup range may be further adjusted when it is determined that an error of an originally configured sound pickup range is large due to a location change of the participants. In this way, the sound pickup device does not frequently determine the sound pickup range, thereby helping reduce calculation costs and improve efficiency of adjusting the sound pickup range.

The foregoing describes in detail the sound pickup method in embodiments of the present disclosure with reference to FIG. 3 to FIG. 12. The following describes in detail a sound pickup apparatus in embodiments of the present disclosure with reference to FIG. 13 and FIG. 14.

Figure 13:
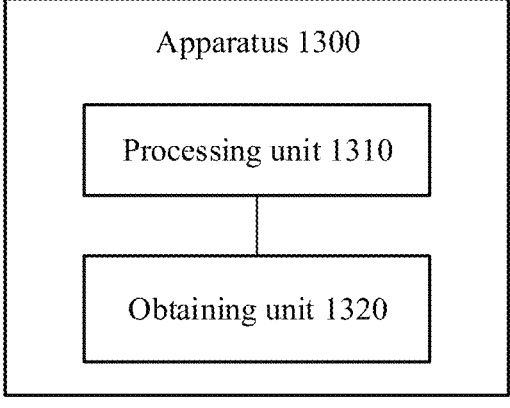
FIG. 13 is a schematic block diagram of a sound pickup apparatus according to an embodiment of the present disclosure.

FIG. 13 shows a sound pickup apparatus 1300 according to an embodiment of the present disclosure. The apparatus 1300 includes a processing unit 1310 and an obtaining unit 1320.

The obtaining unit 1320 is configured to obtain, by using a camera, an image including at least one person.

The processing unit 1310 is configured to: determine a target person based on the image that is shot by the camera and that includes the at least one person, and determine a range in which the target person is located as a target sound pickup range.

The obtaining unit 1320 is further configured to obtain a sound of the target person in the target sound pickup range by using a microphone.

Optionally, the processing unit 1310 is further configured to determine the target person based on angle information of the at least one person relative to the camera and a distance from the at least one person to the camera, where the angle information is determined based on a correspondence between pixel information of the at least one person in the image shot by the camera and a field of view of the camera.

Optionally, the processing unit 1310 is further configured to determine the target person based on location information of the at least one person in the image shot by the camera and angle information of the at least one person relative to the camera, where the location information is pixel information of the at least one person in the image shot by the camera.

Optionally, the processing unit 1310 is further configured to: determine a difference between coordinates of the at least one person in a first image and a second image as parallax of the at least one person, and determine the distance from the at least one person to the camera based on the parallax of the at least one person.

Optionally, the distance from the at least one person to the camera is obtained by using a depth sensor.

Optionally, the at least one person includes two or more persons. The processing unit 1310 is further configured to: classify the at least one person into at least two types of persons by using a clustering algorithm and the angle information; determine angles between the at least two types of persons and a preset central location based on angle information of the at least two types of persons; select, from the at least two types of persons, a target cluster whose angle from the preset central location is less than or equal to a first threshold and whose quantity of persons is greater than or equal to a second threshold; and determine a person in the target cluster as the target person.

Optionally, the at least one person includes two or more persons. The processing unit 1310 is further configured to: determine two-dimensional coordinates of the at least one person on a horizontal plane based on the distance from the at least one person to the camera and the angle information; classify the at least one person into at least two types of persons by using a clustering algorithm and the two-dimensional coordinates; determine distances between the at least two types of persons and a preset central location based on the two-dimensional coordinates of the at least two types of persons; select, from the at least two types of persons, a target cluster whose distance from the preset central location is less than or equal to a third threshold and whose quantity of persons is greater than or equal to a fourth threshold; and determine a person in the target cluster as the target person.

Optionally, the apparatus 1300 further includes an obtaining unit. The obtaining unit is configured to obtain a third image of the at least one person at a first moment and a fourth image of the at least one person at a second moment by using the camera. The processing unit 1310 is further configured to determine, based on location information of the at least one person in the third image and the fourth image, that a movement range of the at least one person is less than or equal to a fifth threshold.

Optionally, the processing unit 1310 is further configured to: determine a candidate sound pickup range based on the range in which the target person is located, and compare the candidate sound pickup range with a sound pickup range configured on the apparatus; and determine that an amplitude of a difference between the candidate sound pickup range and the sound pickup range configured on the apparatus is greater than or equal to a sixth threshold.

The apparatus 1300 herein is embodied in a form of a functional module. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 1300 may be specifically the sound pickup device in the foregoing embodiments, or a function of the sound pickup device in the foregoing embodiments may be integrated into the apparatus 1300. The apparatus 1300 may be configured to perform procedures and/or steps corresponding to the sound pickup device in the foregoing method embodiments. To avoid repetition, details are not described herein again.

The apparatus 1300 has a function of implementing corresponding steps performed by the sound pickup device in the foregoing method. The function may be implemented by using hardware, or may be implemented by hardware by executing corresponding software. The hardware or the software includes one or more modules corresponding to the function.

In this embodiment of the present disclosure, the apparatus 1300 in FIG. 13 may alternatively be a chip or a chip system, for example, a system on chip (SoC).

Figure 14:
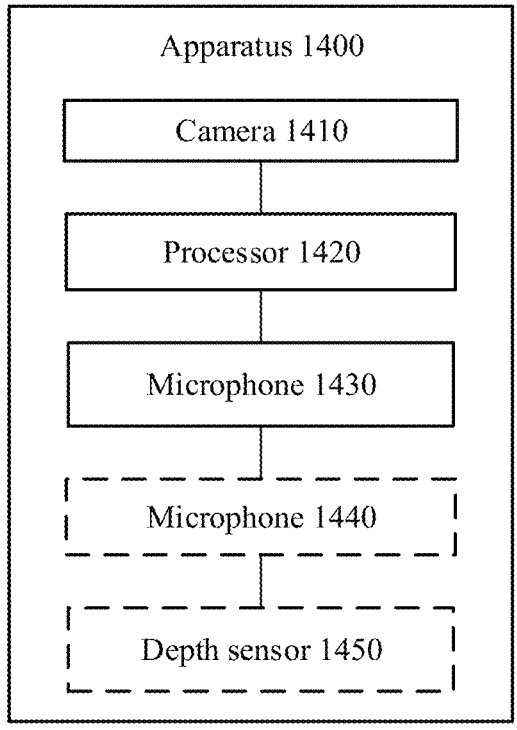
FIG. 14 is a schematic block diagram of another sound pickup apparatus according to an embodiment of the present disclosure.

FIG. 14 shows another sound pickup apparatus 1400 according to an embodiment of the present disclosure. The apparatus 1400 includes a camera 1410, a processor 1420, and a microphone 1430.

The camera 1410 is configured to obtain an image including at least one person.

The processor 1420 is configured to: determine a target person based on the image that is shot by the camera and that includes the at least one person, and determine a range in which the target person is located as a target sound pickup range.

The microphone 1430 is configured to obtain a sound of the target person in the target sound pickup range.

Optionally, the apparatus 1400 may further include a microphone 1440. The microphone 1440 is configured to pick up the sound of the target person in the target sound pickup range with the microphone 1430.

Optionally, the processor 1420 is further configured to determine the target person based on angle information of the at least one person relative to the camera and a distance from the at least one person to the camera, where the angle information is determined based on a correspondence between pixel information of the at least one person in the image shot by the camera and a field of view of the camera.

Optionally, the processor 1420 is further configured to determine the target person based on location information of the at least one person in the image shot by the camera and angle information of the at least one person relative to the camera, where the location information is pixel information of the at least one person in the image shot by the camera.

Optionally, the processor 1420 is further configured to: determine a difference between coordinates of the at least one person in a first image and a second image as parallax of the at least one person, and determine the distance from the at least one person to the camera based on the parallax of the at least one person.

Optionally, the apparatus 1400 may further include a depth sensor 1450. The depth sensor 1450 is configured to obtain the distance from the at least one person to the camera.

Optionally, the at least one person includes two or more persons. The processor 1420 is further configured to: classify the at least one person into at least two types of persons by using a clustering algorithm and the angle information; determine angles between the at least two types of persons and a preset central location based on angle information of the at least two types of persons; select, from the at least two types of persons, a target cluster whose angle from the preset central location is less than or equal to a first threshold and whose quantity of persons is greater than or equal to a second threshold; and determine a person in the target cluster as the target person.

Optionally, the at least one person includes two or more persons. The processor 1420 is further configured to: determine two-dimensional coordinates of the at least one person on a horizontal plane based on the distance from the at least one person to the camera and the angle information; classify the at least one person into at least two types of persons by using a clustering algorithm and the two-dimensional coordinates; determine distances between the at least two types of persons and a preset central location based on the two-dimensional coordinates of the at least two types of persons; select, from the at least two types of persons, a target cluster whose distance from the preset central location is less than or equal to a third threshold and whose quantity of persons is greater than or equal to a fourth threshold; and determine a person in the target cluster as the target person.

Optionally, the processor 1420 is further configured to: obtain a third image of the at least one person at a first moment and a fourth image of the at least one person at a second moment by using the camera, and determine, based on location information of the at least one person in the third image and the fourth image, that a movement range of the at least one person is less than or equal to a fifth threshold.

Optionally, the processor 1420 is further configured to: determine a candidate sound pickup range based on the range in which the target person is located, and compare the candidate sound pickup range with a sound pickup range configured on the apparatus; and determine that an amplitude of a difference between the candidate sound pickup range and the sound pickup range configured on the apparatus is greater than or equal to a sixth threshold.

It should be understood that the apparatus 1400 may be specifically the sound pickup device in the foregoing embodiments, or a function of the sound pickup device in the foregoing embodiments may be integrated into the apparatus 1400. The apparatus 1400 may be configured to perform steps and/or procedures corresponding to the sound pickup device in the foregoing method embodiments.

The present disclosure provides a readable computer storage medium. The readable computer storage medium is configured to store a computer program. The computer program is used to implement the method corresponding to the sound pickup device in the foregoing embodiments.

The present disclosure provides a chip system. The chip system is configured to support the sound pickup device in implementing the functions shown in embodiments of the present disclosure.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of the present disclosure.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in the present disclosure, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of the embodiments.

In addition, function units in embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of the present disclosure. The foregoing storage medium includes any medium that can store program code, such as a universal serial bus (USB) flash drive, a removable hard disk, a read-only memory (ROM), a random-access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by a device, the method comprising:

obtaining an image using a camera of the device, wherein the image comprises at least one person;

determining a target person in the image;

determining a target sound pickup range based on a location of the target person in the image, wherein the target sound pickup range is a bounded area; and performing sound pickup in the target sound pickup range using a microphone of the device, wherein determining the target person comprises determining the target person based on location information and first angle information of the at least one person relative to the camera, and wherein the location information is pixel information of the at least one person, wherein the at least one person comprises two or more persons and wherein determining the target person based on the location information and the first angle information comprises:

classifying the at least one person into at least two types of persons using a clustering algorithm and the first angle information;

determining angles between the at least two types of persons and a preset central location based on second angle information of the at least two types of persons;

selecting, from the at least two types of persons, a target cluster having an angle from the preset central location that is less than or equal to a first threshold and having a quantity of persons that is greater than or equal to a second threshold; and determining the target person from the target cluster.

2. The method of claim 1, wherein determining the target person further comprises determining the target person based on a distance of the at least one person relative to the camera.

3. The method of claim 2, wherein the image comprises a first image and a second image, wherein both the first image and the second image comprise the at least one person.

4. The method of claim 2, further comprising obtaining the distance using a depth sensor.

5. The method of claim 3, further comprising:

determining a parallax of the at least one person based on a difference between first coordinates of the at least one person in the first image and second coordinates of the at least one person in the second image; and determining the distance based on the parallax.

6. The method of claim 1, wherein prior to determining the target person, the method further comprises:

obtaining a third image of the at least one person at a first moment using the camera;

obtaining a fourth image of the at least one person at a second moment using the camera; and determining, based on the location information of the at least one person in the third image and the fourth image, that a movement range of the at least one person is less than or equal to a fifth threshold.

7. The method of claim 6, wherein prior to determining the target sound pickup range, the method further comprises:

determining a candidate sound pickup range based on the location of the target person;

comparing the candidate sound pickup range with a sound pickup range configured on the device; and determining that an amplitude difference between the candidate sound pickup range and the sound pickup range configured on the device is greater than or equal to a sixth threshold.

8. A device comprising:

a memory configured to store instructions; and one or more processors coupled to the memory and configured to execute the instructions to cause the device to:

obtain a first image using a camera of the device, wherein the first image comprises at least one person;

determine a target person in the first image;

determine a target sound pickup range based on a location of the target person in the first image, wherein the target sound pickup range is a bounded area;

perform sound pickup in the target sound pickup range using a microphone of the device;

wherein prior to determining the target person, the one or more processors are further configured execute the instructions to cause the device to:

obtain a second image of the at least one person at a first moment using the camera;

obtain a third image of the at least one person at a second moment using the camera; and determine, based on location information of the at least one person in the second image and the third image, that a movement range of the at least one person is less than or equal to a first threshold, and wherein prior to determining the target sound pickup range, the one or more processors are further configured execute the instructions to cause the device to:

determine a candidate sound pickup range based on a location of the target person;

compare the candidate sound pickup range with a sound pickup range configured on the device; and determine that an amplitude difference between the candidate sound pickup range and the sound pickup range configured on the device is greater than or equal to a second threshold.

9. The device of claim 8, wherein the one or more processors are further configured to execute the instructions to determine the target person by determining the target person based on angle information and a distance of the at least one person relative to the camera, and wherein the angle information is based on a correspondence between pixel information of the at least one person in the first image and a field of view of the camera.

10. The device of claim 8, wherein the one or more processors are further configured to execute the instructions to determine the target person by determining the target person based on location information and first angle information of the at least one person relative to the camera, and wherein the location information is pixel information of the at least one person.

11. The device of claim 9, wherein the first image comprises a fourth image and a fifth image, wherein both the fourth image and the fifth image comprise the at least one person, and wherein the one or more processors are further configured to execute the instructions to cause the device to:
  determine a parallax of the at least one person based on a difference between first coordinates of the at least one person in the fourth image and second coordinates of the at least one person in the fifth image; and
  determine the distance based on the parallax.

12. The device of claim 9, wherein the one or more processors are further configured to execute the instructions to cause the device to obtain the distance using a depth sensor.

13. The device of claim 10, wherein the at least one person comprises two or more persons, and wherein the one or more processors are further configured to execute the instructions to determine the target person based on the location information and the first angle information by:
  classifying the at least one person into at least two types of persons using a clustering algorithm and the first angle information;
  determining angles between the at least two types of persons and a preset central location based on second angle information of the at least two types of persons;
  selecting, from the at least two types of persons, a target cluster having an angle from the preset central location that is less than or equal to a first threshold and having a quantity of persons that is greater than or equal to a second threshold; and
  determining the target person from the target cluster.

14. A computer program product comprising computer-executable instructions that are stored on a non-transitory computer-readable storage medium and that, when executed by one or more processors of a device, cause the device to:
  obtain a first image using a camera of the device, wherein the first image comprises at least one person;
  determine a target person in the first image;
  determine a target sound pickup range based on a location of the target person in the first image, wherein the target sound pickup range is a bounded area; and
  perform sound pickup in the target sound pickup range using a microphone of the device,
  wherein prior to determining the target person, the one or more processors are further configured execute the instructions to cause the device to:
    obtain a second image of the at least one person at a first moment using the camera;
    obtain a third image of the at least one person at a second moment using the camera; and
    determine, based on location information of the at least one person in the second image and the third image, that a movement range of the at least one person is less than or equal to a first threshold, and
  wherein prior to determining the target sound pickup range, the one or more processors are further configured execute the instructions to cause the device to:
    determine a candidate sound pickup range based on a location of the target person;

compare the candidate sound pickup range with a sound pickup range configured on the device; and
    determine that an amplitude difference between the candidate sound pickup range and the sound pickup range configured on the device is greater than or equal to a second threshold.

15. The computer program product of claim 14, wherein the one or more processors are further configured to execute the instructions to determine the target person by determining the target person based on angle information and a distance of the at least one person relative to the camera, and wherein the angle information is based on a correspondence between pixel information of the at least one person in the first image and a field of view of the camera.

16. The computer program product of claim 14, wherein the one or more processors are further configured to execute the instructions to determine the target person by determining the target person based on location information and first angle information of the at least one person relative to the camera, and wherein the location information is pixel information of the at least one person.

17. The computer program product of claim 15, wherein the first image comprises a fourth image and a fifth image, wherein both the fourth image and the fifth image comprise the at least one person, and wherein the one or more processors are further configured to execute the instructions to cause the device to:
  determine a parallax of the at least one person based on a difference between first coordinates of the at least one person in the fourth image and second coordinates of the at least one person in the fifth image; and
  determine the distance based on the parallax.

18. The computer program product of claim 15, wherein the one or more processors are further configured to execute the instructions to cause the device to obtain the distance using a depth sensor.

19. The computer program product of claim 16, wherein the at least one person comprises two or more persons, and wherein the one or more processors are further configured to execute the instructions to determine the target person based on the location information and the first angle information by:
  classifying the at least one person into at least two types of persons using a clustering algorithm and the first angle information;
  determining angles between the at least two types of persons and a preset central location based on second angle information of the at least two types of persons;
  selecting, from the at least two types of persons, a target cluster having an angle from the preset central location that is less than or equal to a first threshold and having a quantity of persons that is greater than or equal to a second threshold; and
  determining the target person from the target cluster.

20. A method implemented by a device, the method comprising:
  obtaining an image using a camera of the device, wherein the image comprises at least one person;
  determining a target person in the image;
  determining a target sound pickup range based on a location of the target person in the image, wherein the target sound pickup range is a bounded area; and
  performing sound pickup in the target sound pickup range using a microphone of the device,
  wherein determining the target person comprises determining the target person based on location information and first angle information of the at least one person relative to the camera, and wherein the location information is pixel information of the at least one person, wherein the at least one person comprises two or more persons, and wherein determining the target person based on the location information and the first angle information comprises: 5 classifying the at least one person into at least two types of persons using a clustering algorithm and the first angle information;

determining angles between the at least two types of persons and a preset central location based on second angle information of the at least two types of persons; 10 selecting, from the at least two types of persons, a target cluster having an angle from the preset central location that is less than or equal to a first threshold and having a quantity of persons that is greater than or equal to a second threshold; and 15 determining the target person from the target cluster.

* * * * *

20